(12) United States Patent
Raghavan et al.

(10) Patent No.: US 11,909,496 B2
(45) Date of Patent: Feb. 20, 2024

(54) BEAM SWITCHING IN NEAR-FIELD OPERATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/456,196

(22) Filed: Nov. 23, 2021

(65) Prior Publication Data

US 2023/0163831 A1 May 25, 2023

(51) Int. Cl.
*H04B 7/08* (2006.01)
*H04W 64/00* (2009.01)
*H04W 4/80* (2018.01)

(52) U.S. Cl.
CPC ............. *H04B 7/088* (2013.01); *H04B 7/086* (2013.01); *H04W 64/00* (2013.01); *H04W 4/80* (2018.02)

(58) Field of Classification Search
CPC ....... H04B 7/088; H04B 7/086; H04W 64/00; H04W 4/80
See application file for complete search history.

(56) References Cited

U.S. PATENT DOCUMENTS

| | | | | |
|---|---|---|---|---|
| 10,602,549 | B2 * | 3/2020 | Tsai ..................... | H04B 7/0626 |
| 10,638,483 | B2 * | 4/2020 | Zhou ................. | H04W 72/0446 |
| 10,651,917 | B2 * | 5/2020 | John Wilson ......... | H04L 5/0073 |
| 10,764,896 | B2 * | 9/2020 | Guo ..................... | H04B 7/0695 |
| 10,873,386 | B2 * | 12/2020 | Zhou ................... | H04W 72/20 |
| 10,879,991 | B2 * | 12/2020 | Zhou ................... | H04B 7/0877 |

(Continued)

FOREIGN PATENT DOCUMENTS

| | | | |
|---|---|---|---|
| AU | 2018361151 A1 | * | 5/2020 |
| BR | 112021002159 A2 | * | 5/2021 |

(Continued)

OTHER PUBLICATIONS

Maggi et al., Millimeter-Wave Phased Arrays and Over-the-Air Characterization for 5G and Beyond_ Overview on 5G mm-Wave Phased Arrays and OTA Characterization, IEEE, May 2022 (Year: 2022).*

(Continued)

*Primary Examiner* — Berhanu Tadese
(74) *Attorney, Agent, or Firm* — Patterson & Sheridan LLP

(57) ABSTRACT

Certain aspects of the present disclosure provide techniques for wireless communication by a user equipment (UE). For example, the UE receives a first indication indicating a same quasi co-location (QCL) mapping for multiple receive beams corresponding to a group of transmit and receive beam pairs from a network entity. Transmit and receive beam pairs are different from each other and grouping of the transmit and receive beam pairs is based on a distance between the UE and the network entity. The UE selects one of the multiple receive beams corresponding to the group of transmit and receive beam pairs, based on the distance between the UE and the network entity.

30 Claims, 15 Drawing Sheets

(56) References Cited

U.S. PATENT DOCUMENTS

| | | | |
|---|---|---|---|
| 11,088,778 B2* | 8/2021 | Guan | H04B 7/088 |
| 11,096,219 B2* | 8/2021 | Huang | H04W 72/1268 |
| 11,109,380 B2* | 8/2021 | John Wilson | H04B 7/0417 |
| 11,139,880 B2* | 10/2021 | Zhou | H04W 76/27 |
| 11,152,992 B2* | 10/2021 | Zhou | H04B 7/063 |
| 11,233,559 B2* | 1/2022 | Levitsky | H04B 7/0617 |
| 11,290,174 B2* | 3/2022 | Zhou | H04B 7/0404 |
| 11,349,543 B2* | 5/2022 | Zhou | H04B 7/0617 |
| 11,362,723 B2* | 6/2022 | Farag | H04B 7/0695 |
| 11,398,930 B2* | 7/2022 | Kwak | H04W 8/24 |
| 11,405,092 B2* | 8/2022 | Cirik | H04W 72/046 |
| 11,405,094 B2* | 8/2022 | Khoshnevisan | H04W 80/02 |
| 11,425,706 B2* | 8/2022 | Cirik | H04W 48/08 |
| 11,438,775 B2* | 9/2022 | Cirik | H04W 72/53 |
| 11,444,680 B2* | 9/2022 | Khoshnevisan | H04W 56/001 |
| 11,463,994 B2* | 10/2022 | Yang | H04W 72/20 |
| 11,516,052 B2* | 11/2022 | Kuang | H04W 72/542 |
| 11,540,145 B2* | 12/2022 | Raghavan | H04W 16/28 |
| 11,546,197 B2* | 1/2023 | Yamada | H04L 1/08 |
| 11,558,151 B2* | 1/2023 | Gao | H04L 5/0098 |
| 11,606,821 B2* | 3/2023 | Zhang | H04W 72/23 |
| 11,728,856 B2* | 8/2023 | Zhang | H04B 7/0691 375/262 |
| 11,737,112 B2* | 8/2023 | Khoshnevisan | H04L 5/0048 |
| 11,743,939 B2* | 8/2023 | Zhang | H04W 80/02 370/329 |
| 2019/0141691 A1* | 5/2019 | Kwon | H04W 72/12 |
| 2019/0260532 A1 | 8/2019 | Manolakos et al. | |
| 2019/0342907 A1* | 11/2019 | Huang | H04W 72/23 |
| 2020/0068501 A1* | 2/2020 | Wang | H04W 52/14 |
| 2020/0204242 A1* | 6/2020 | Zhou | H04W 72/21 |
| 2020/0204288 A1* | 6/2020 | Zhou | H04L 1/18 |
| 2020/0267571 A1 | 8/2020 | Park et al. | |
| 2021/0135741 A1* | 5/2021 | Zhou | H04B 7/088 |
| 2021/0195599 A1* | 6/2021 | Bai | H04L 5/0053 |
| 2021/0226688 A1* | 7/2021 | Khoshnevisan | H04L 5/0092 |
| 2021/0274487 A1* | 9/2021 | Matsumura | H04B 7/0695 |
| 2021/0306996 A1* | 9/2021 | Matsumura | H04L 5/0048 |
| 2021/0307076 A1* | 9/2021 | Matsumura | H04B 7/0695 |
| 2021/0314053 A1* | 10/2021 | Matsumura | H04L 5/0025 |
| 2021/0337398 A1* | 10/2021 | Kumar | H04W 24/08 |
| 2021/0352706 A1* | 11/2021 | Kang | H04B 7/0695 |
| 2021/0359745 A1* | 11/2021 | Farag | H04B 7/0626 |
| 2021/0360611 A1* | 11/2021 | Manolakos | H04W 64/00 |
| 2021/0377914 A1* | 12/2021 | Park | H04W 72/23 |
| 2021/0385847 A1* | 12/2021 | Kang | H04L 5/0094 |
| 2022/0045893 A1* | 2/2022 | Yamada | H04L 5/0044 |
| 2022/0046458 A1* | 2/2022 | Zhu | H04W 72/046 |
| 2022/0046588 A1* | 2/2022 | Yeo | H04W 4/06 |
| 2022/0061117 A1* | 2/2022 | Liou | H04W 76/19 |
| 2022/0116859 A1* | 4/2022 | Park | H04W 52/365 |
| 2022/0124740 A1* | 4/2022 | Ji | H04L 1/06 |
| 2022/0124782 A1* | 4/2022 | Park | H04W 72/044 |
| 2022/0140878 A1* | 5/2022 | Zhu | H04B 7/0626 370/252 |
| 2022/0149899 A1* | 5/2022 | Jung | H04B 7/024 |
| 2022/0158805 A1* | 5/2022 | Frenne | H04W 72/23 |
| 2022/0167378 A1* | 5/2022 | Matsumura | H04W 72/044 |
| 2022/0173857 A1* | 6/2022 | Michalopoulos | H04B 17/27 |
| 2022/0217643 A1* | 7/2022 | Zhou | H04W 52/42 |
| 2022/0225141 A1* | 7/2022 | Bai | H04W 24/10 |
| 2022/0240309 A1* | 7/2022 | Sakhnini | H04L 5/0023 |
| 2022/0256585 A1* | 8/2022 | Yoon | H04B 7/088 |
| 2022/0294497 A1* | 9/2022 | Choi | H04B 7/088 |
| 2022/0295296 A1* | 9/2022 | Raghavan | H04B 7/024 |
| 2022/0295530 A1* | 9/2022 | Lee | H04L 5/0094 |
| 2022/0321193 A1* | 10/2022 | Uchino | H04B 7/088 |
| 2022/0321194 A1* | 10/2022 | Uchino | H04W 52/365 |
| 2022/0321195 A1* | 10/2022 | Uchino | H04B 7/088 |
| 2022/0345197 A1* | 10/2022 | Farag | H04B 7/0695 |
| 2022/0345909 A1* | 10/2022 | Song | H04W 72/23 |
| 2023/0017004 A1* | 1/2023 | Zhang | H04L 5/0048 |
| 2023/0037644 A1* | 2/2023 | Huang | H04W 72/51 |
| 2023/0058050 A1* | 2/2023 | Abedini | H04W 64/003 |
| 2023/0058859 A1* | 2/2023 | Abedini | H04W 48/08 |
| 2023/0072920 A1* | 3/2023 | Zhang | H04L 5/0044 |
| 2023/0209587 A1* | 6/2023 | Zhang | H04W 72/542 370/329 |

FOREIGN PATENT DOCUMENTS

| | | | | |
|---|---|---|---|---|
| BR | 112021002272 A2 * | 5/2021 | | |
| CN | 109997398 A * | 7/2019 | | H04B 17/373 |
| CN | 110417449 A * | 11/2019 | | H04B 17/373 |
| CN | 110474668 A * | 11/2019 | | H04B 17/373 |
| CN | 111316739 A * | 6/2020 | | H04B 7/00 |
| CN | 111656839 A * | 9/2020 | | H04B 7/0626 |
| CN | 109996351 B * | 11/2020 | | H04B 15/00 |
| CN | 111901020 A * | 11/2020 | | H04B 7/0426 |
| CN | 111937457 A * | 11/2020 | | H04B 7/0695 |
| CN | 112005513 A * | 11/2020 | | H04B 7/0417 |
| CN | 112075036 A * | 12/2020 | | H04B 17/104 |
| CN | 112119672 A * | 12/2020 | | H04B 7/022 |
| CN | 109802787 B * | 1/2021 | | |
| CN | 110417449 B * | 3/2021 | | H04B 17/373 |
| CN | 110474668 B * | 3/2021 | | H04B 17/373 |
| CN | 112567785 A * | 3/2021 | | H04B 7/0695 |
| CN | 112690012 A * | 4/2021 | | H04B 7/0695 |
| CN | 112740566 A * | 4/2021 | | H04B 7/0602 |
| CN | 112740736 A * | 4/2021 | | H04B 7/0695 |
| CN | 112840612 A * | 5/2021 | | H04B 17/373 |
| CN | 112913177 A * | 6/2021 | | H04L 5/0048 |
| CN | 112913178 A * | 6/2021 | | H04B 7/0695 |
| CN | 113196683 A * | 7/2021 | | H04B 7/0695 |
| CN | 113196684 A * | 7/2021 | | H04B 7/0408 |
| CN | 113196687 A * | 7/2021 | | H04B 7/0686 |
| CN | 113424461 A * | 9/2021 | | H04B 7/0695 |
| CN | 113785506 A * | 12/2021 | | H04B 7/088 |
| CN | 113812099 A * | 12/2021 | | H04B 7/0626 |
| CN | 109997398 B * | 2/2022 | | H04B 17/373 |
| CN | 114128383 A * | 3/2022 | | H04B 7/0404 |
| CN | 114175524 A * | 3/2022 | | H04B 17/13 |
| CN | 114513797 A * | 5/2022 | | H04B 17/373 |
| CN | 114731184 A * | 7/2022 | | H04B 7/024 |
| CN | 114946150 A * | 8/2022 | | H04L 5/0048 |
| CN | 114982183 A * | 8/2022 | | H04L 5/0044 |
| CN | 115004600 A * | 9/2022 | | H04B 7/024 |
| CN | 115066858 A * | 9/2022 | | H04B 7/022 |
| CN | 115244875 A * | 10/2022 | | H04B 7/0626 |
| CN | 115380591 A * | 11/2022 | | H04B 7/0665 |
| EP | 3537835 A1 * | 9/2019 | | H04B 7/0626 |
| EP | 3565172 B1 * | 11/2020 | | H04L 5/0023 |
| EP | 3734888 A1 * | 11/2020 | | H04B 7/0695 |
| EP | 3809779 A1 * | 4/2021 | | H04L 5/001 |
| EP | 3823336 A1 * | 5/2021 | | H04N 7/0695 |
| EP | 3823337 A1 * | 5/2021 | | H04B 7/0695 |
| EP | 3833078 A1 * | 6/2021 | | H04B 7/0695 |
| EP | 3836501 A1 * | 6/2021 | | H04B 17/373 |
| EP | 3855664 A1 * | 7/2021 | | H04L 5/0048 |
| EP | 3855665 A1 * | 7/2021 | | H04B 7/0695 |
| EP | 3890203 A1 * | 10/2021 | | H04B 17/373 |
| EP | 3591867 B1 * | 11/2021 | | H04L 7/0695 |
| EP | 3905749 A1 * | 11/2021 | | H04L 27/2613 |
| EP | 3681070 B1 * | 3/2022 | | H04L 1/1614 |
| EP | 3713140 B1 * | 3/2022 | | H04B 7/06 |
| EP | 3989633 A1 * | 4/2022 | | H04B 7/088 |
| EP | 3998734 A1 * | 5/2022 | | H04B 7/06 |
| EP | 4009725 A1 * | 6/2022 | | H04L 5/0023 |
| EP | 4068877 A1 * | 10/2022 | | |
| EP | 4075899 A1 * | 10/2022 | | H04W 16/28 |
| EP | 4087174 A1 * | 11/2022 | | H04B 7/0695 |
| EP | 4096107 A1 * | 11/2022 | | H04B 7/0426 |
| EP | 4099578 A1 * | 12/2022 | | H04B 17/373 |
| ES | 2909601 T3 * | 5/2022 | | H04B 7/06 |
| JP | 7096334 B2 * | 7/2022 | | H04B 7/0695 |
| JP | 7096335 B2 * | 7/2022 | | H04B 7/0695 |
| JP | 7137691 B2 * | 9/2022 | | H04B 7/022 |
| JP | 7144118 B2 * | 9/2022 | | H04L 5/001 |
| TW | 202015461 A * | 4/2020 | | H04L 5/0023 |
| TW | 202015465 A * | 4/2020 | | H04B 7/022 |
| TW | 202030996 A * | 8/2020 | | H04B 7/0695 |
| TW | 202031073 A * | 8/2020 | | H04B 7/022 |
| TW | 202107912 A * | 2/2021 | | H04B 7/0404 |

(56) References Cited

FOREIGN PATENT DOCUMENTS

| | | | | |
|---|---|---|---|---|
| TW | 202135485 A | * | 9/2021 | |
| WO | WO-2019093764 A1 | * | 5/2019 | |
| WO | WO-2019095893 A1 | * | 5/2019 | |
| WO | WO-2019128581 A1 | * | 7/2019 | |
| WO | WO-2019133540 A1 | * | 7/2019 | |
| WO | WO-2019140256 A1 | * | 7/2019 | ........... H04B 7/0626 |
| WO | WO-2019164643 A1 | * | 8/2019 | ............. H04B 7/022 |
| WO | WO-2019194923 A1 | * | 10/2019 | ........... H04B 7/0417 |
| WO | WO-2019212682 A1 | * | 11/2019 | ........... H04B 17/104 |
| WO | WO-2019215381 A1 | * | 11/2019 | ............. H04B 7/022 |
| WO | WO-2020012661 A1 | * | 1/2020 | ........... H04B 7/0695 |
| WO | WO-2020012662 A1 | * | 1/2020 | ........... H04B 7/0695 |
| WO | WO-2020031343 A1 | * | 2/2020 | |
| WO | WO-2020080915 A1 | * | 4/2020 | |
| WO | WO-2020080916 A1 | * | 4/2020 | |
| WO | WO-2020101897 A1 | * | 5/2020 | |
| WO | WO-2020131936 A1 | * | 6/2020 | |
| WO | WO-2020132114 A1 | * | 6/2020 | |
| WO | WO-2020132419 A1 | * | 6/2020 | |
| WO | WO-2020144773 A1 | * | 7/2020 | .......... H04W 52/146 |
| WO | WO-2020144774 A1 | * | 7/2020 | ................ H04B 7/00 |
| WO | WO-2020144775 A1 | * | 7/2020 | ........... H04L 5/0023 |
| WO | WO-2020166081 A1 | * | 8/2020 | ........... H04B 7/0695 |
| WO | WO-2020215107 A2 | * | 10/2020 | ........... H04L 5/0023 |
| WO | WO-2021011140 A1 | * | 1/2021 | ........... H04B 7/0404 |
| WO | WO-2021087505 A1 | * | 5/2021 | ............. H04B 7/024 |
| WO | WO-2021126401 A1 | * | 6/2021 | |
| WO | WO-2021146017 A1 | * | 7/2021 | |
| WO | WO-2021147933 A1 | * | 7/2021 | |
| WO | WO-2021168645 A1 | * | 9/2021 | |
| WO | WO-2021187862 A1 | * | 9/2021 | |
| WO | WO-2021194217 A1 | * | 9/2021 | |
| WO | WO-2021194681 A1 | * | 9/2021 | |
| WO | WO-2021206389 A1 | * | 10/2021 | |
| WO | WO-2021210906 A1 | * | 10/2021 | |
| WO | WO-2021230686 A1 | * | 11/2021 | |
| WO | WO-2021253055 A2 | * | 12/2021 | |
| WO | WO-2021253055 A9 | * | 1/2022 | |
| WO | WO-2022020694 A1 | * | 1/2022 | |
| WO | WO-2022072830 A1 | * | 4/2022 | |
| WO | WO-2022086169 A1 | * | 4/2022 | |
| WO | WO-2022087190 A1 | * | 4/2022 | |
| WO | WO-2022087392 A1 | * | 4/2022 | |

OTHER PUBLICATIONS

N. Gupta, Autonomous Switched Systems, Georgetown University, 2017 (source: https://nirupam.georgetown.domains/my_files/2017/MLF_autonomous_switched_systems.pdf) (Year: 2017).*

TS 136 213—V14.2.0—LTE; Evolved Universal Terrestrial Radio Access (E-UTRA); Physical layer procedures (3GPP TS 36.213 version 14.2.0 Release 14), Apr. 2017 (Year: 2017).*

TS 138 214—V15.3.0—5G; NR; Physical layer procedures for data (3GPP TS 38.214 version 15.3.0 Release 15), Oct. 2018 (Year: 2018).*

TS 138 214—V16.2.0—5G; NR; Physical layer procedures for data (3GPP TS 38.214 version 16.2.0 Release 16), Jul. 2020 (Year: 2020).*

Wang et al., Near-Field Beam Management in LIS-Assisted mmWave Systems, IEEE 2021 (Year: 2021).*

Maggi et al., Millimeter-Wave Phased Arrays and Over-the-Air Characterization for 5G and Beyond_ Overview on 5G mm-Wave Phased Arrays and OTA Characterization, IEEE, May 2022 (Year: 2022).*

N. Gupta, Autonomous Switched Systems, Georgetown University, 2017 (source: https://nirupam.georgetown.domains/my_files/2017/MLF_autonomous_switched_systems.pdf) (Year: 2017) (Year: 2017).*

TS 136 213—V14.2.0—LTE; Evolved Universal Terrestrial Radio Access (E-UTRA); Physical layer procedures (3GPP TS 36.213 version 14.2.0 Release 14), Apr. 2017(Year: 2017) (Year: 2017).*

TS 138 214—V15.3.0—5G; NR; Physical layer procedures for data (3GPP TS 38.214 version 15.3.0 Release 15), Oct. 2018 (Year: 2018) (Year: 2018).*

TS 138 214—V16.2.0—5G; NR; Physical layer procedures for data (3GPP TS 38.214 version 16.2.0 Release 16), Jul. 2020 (Year: 2020) (Year: 2020).*

Wang et al., Near-Field Beam Management in LIS-Assisted mmWave Systems, IEEE 2021 (Year: 2021) (Year: 2021).*

International Search Report and Written Opinion—PCT/US2022/077101—ISA/EPO —dated Dec. 21, 2022.

Wang T., et al., "Near-Field Beam Management in LIS-Assisted mmWave Systems", 2021 13th International Conference on Wireless Communications and Signal Processing (WCSP), IEEE, Oct. 20, 2021, pp. 1-6, XP034032753.

Wei X., et al., "Codebook Design and Beam Training for Extremely Large-Scale RIS: Far-Field or Near-Field?", arxiv.org, Cornell University Library, 201 Olin Library Cornell University Ithaca, NY 14853, Sep. 21, 2021, 19 Pages, XP091055925.

* cited by examiner

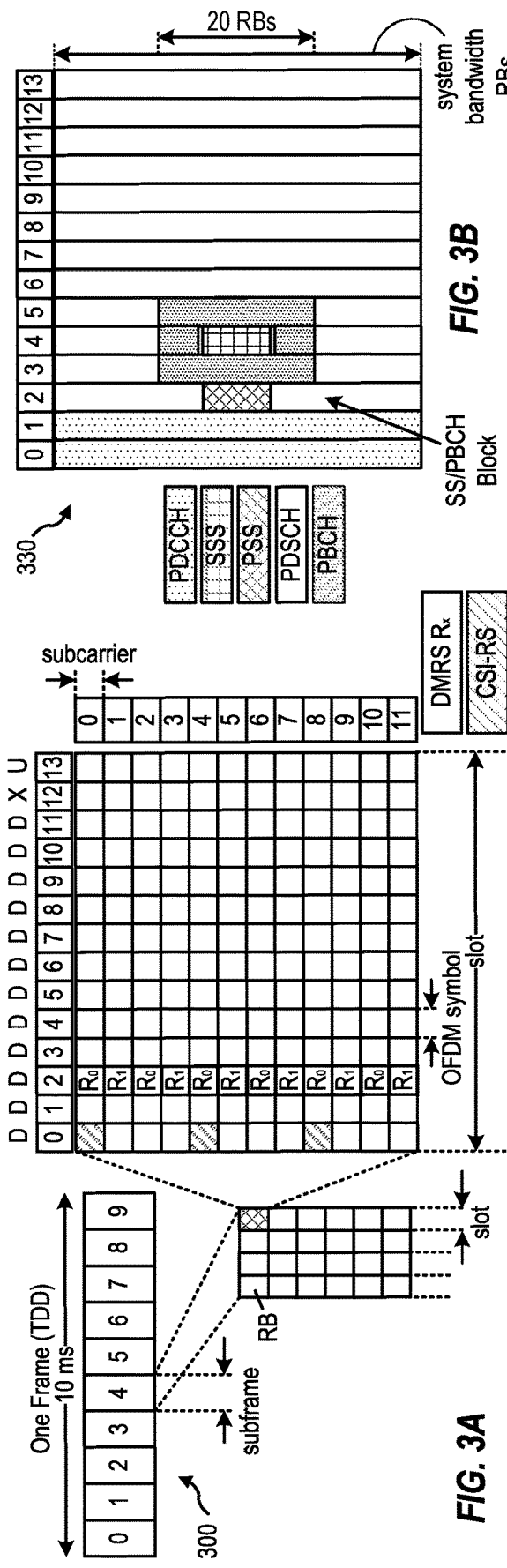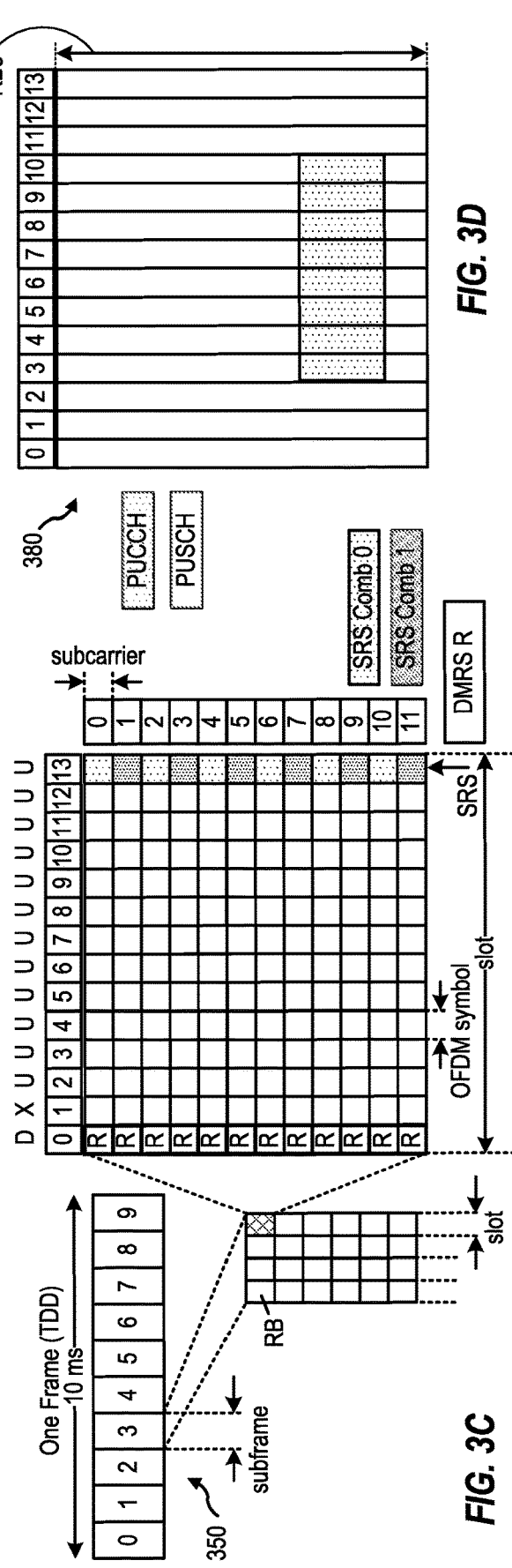

BEAM SWITCHING IN NEAR-FIELD OPERATIONS

INTRODUCTION

Aspects of the present disclosure relate to wireless communications, and more particularly, to techniques for managing beam switching in near-field operations.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), comprising: receiving, from a network entity, a first indication indicating a same quasi co-location (QCL) mapping for multiple receive beams corresponding to a group of transmit and receive beam pairs, wherein transmit and receive beam pairs are different from each other and grouping of the transmit and receive beam pairs is based on a distance between the UE and the network entity; and selecting one of the multiple receive beams corresponding to the group of transmit and receive beam pairs, based on the distance between the UE and the network entity.

Another aspect provides a method for wireless communication by a network entity, comprising: transmitting, to a UE, a first indication indicating a same QCL mapping for multiple receive beams corresponding to a group of transmit and receive beam pairs, wherein transmit and receive beam pairs are different from each other and grouping of the transmit and receive beam pairs is based on a distance between the UE and the network entity; and transmitting, to the UE, a second indication indicating a selection of one of the multiple receive beams corresponding to the group of transmit and receive beam pairs, based on the distance between the UE and the network entity.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for enabling beam switching in near-field operations. For example, different beams may become relevant in the near-field at both gNodeB (gNB) and user equipment (UE) depending on a distance between the gNB and the UE.

When the UE is in a greater distance from the gNB that exceeds a threshold distance determined by an antenna array size at the UE and wavelength, far-field operation prevails. In such cases, beams used for communication between the UE and gNB may stay suitable longer than when operating at closer distances. At closer distances, near-field operation prevails and which beams are suitable may change more rapidly. This rapid change may present a challenge for beam management.

Aspects of the present disclosure present techniques that may help support, in the near-field, efficient and swift beam switches to select a new beam based on the distance between the gNB and the UE (unlike a far-field operation where beams may stay relevant for far longer time-scales). As a result, the techniques presented herein may help improve overall system performance and user experience.

The technique described herein relates to beamformed communications between a transmitter device (e.g., the gNB) and a receiver device (e.g., the UE). Multiple transmit and receive beam pairs are mapped to a same transmission configuration indication (TCI) state identifier (ID) for different transmitter beams, and a same quasi co-location (QCL) state for different receiver beams. The multiple transmit and receive beam pairs are different from each other, and depend on a distance between the transmitter device and the receiver device. Based on the distance between the transmitter device and the receiver device, a beam switch is implemented and a new beam pair is selected. This beam switch may be autonomous or indication-based.

Introduction to Wireless Communication Networks

Figure 1:
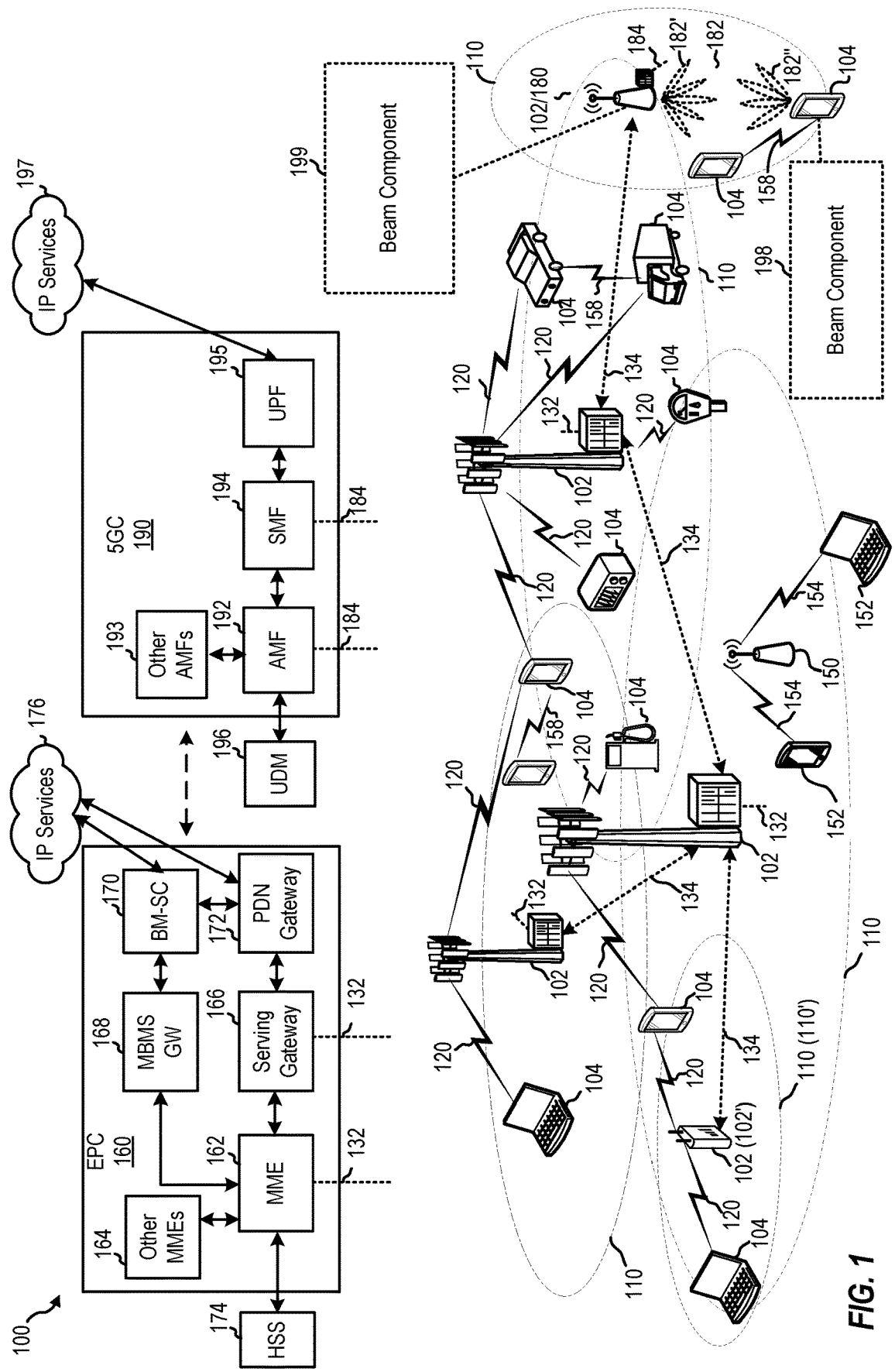
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from UE 104 to BS 102 and/or downlink (DL) (also referred to as forward link) transmissions from BS 102 to UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with UE 104 to improve path loss and range. For example, BS 180 and UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 10:
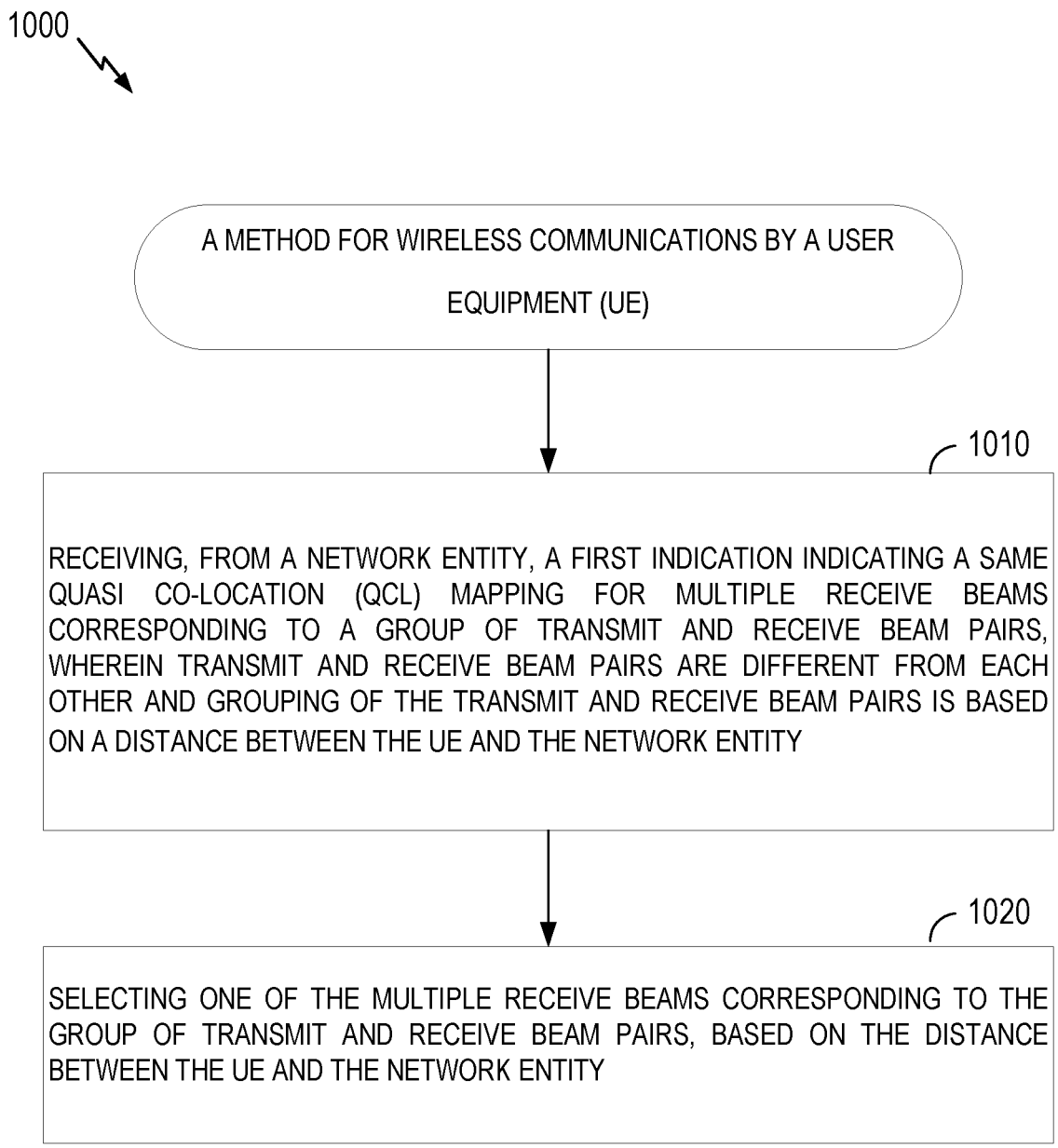
FIG. 10 is a flow diagram illustrating example operations for wireless communication by a UE.
Figure 11:
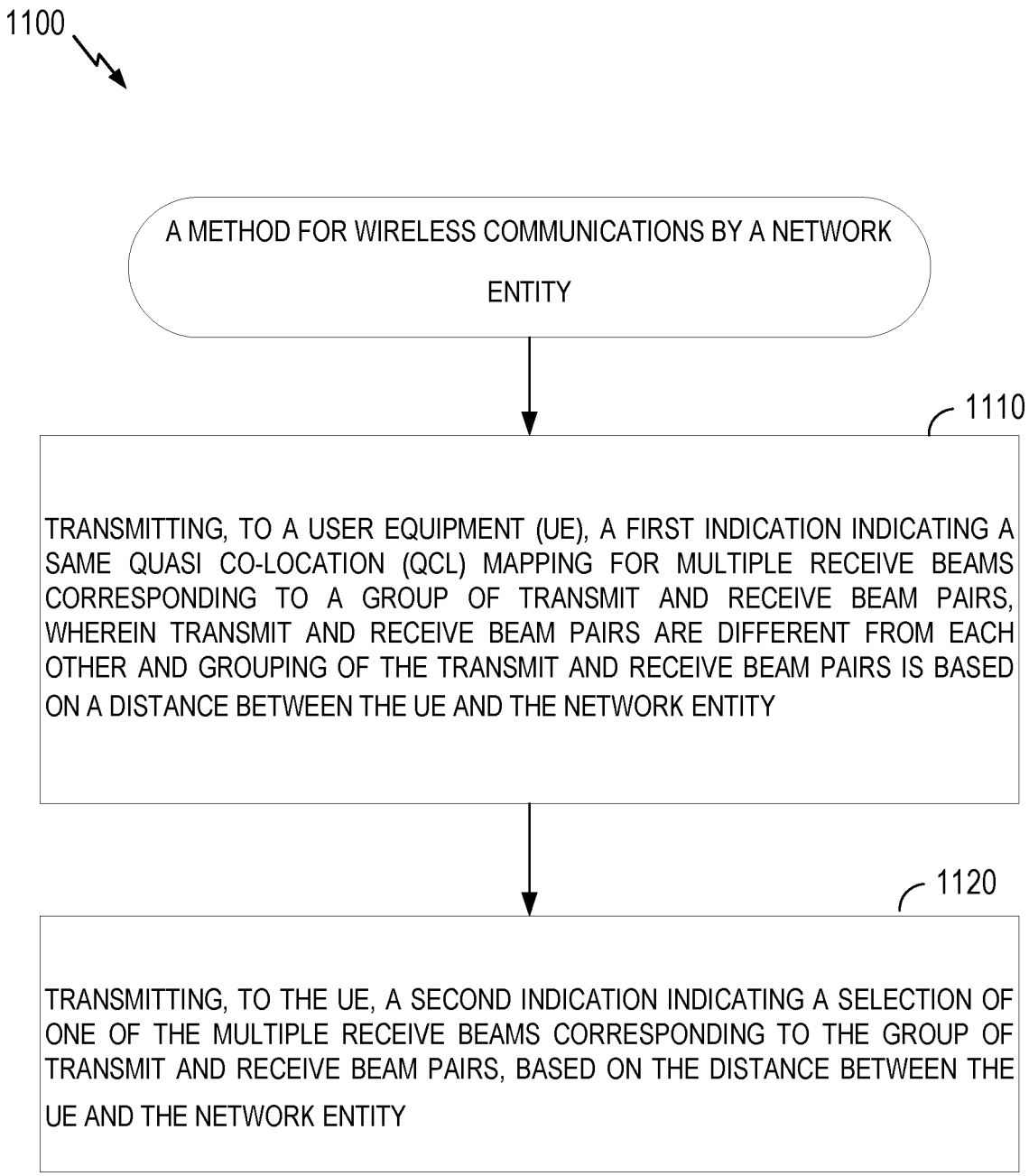
FIG. 11 is a flow diagram illustrating example operations for wireless communication by a network entity.

BS 102 includes beam component 199, which may be configured perform operations 1100 of FIG. 11. UE 104 includes beam component 198, which may be configured to perform operations 1000 of FIG. 10.

Figure 2:
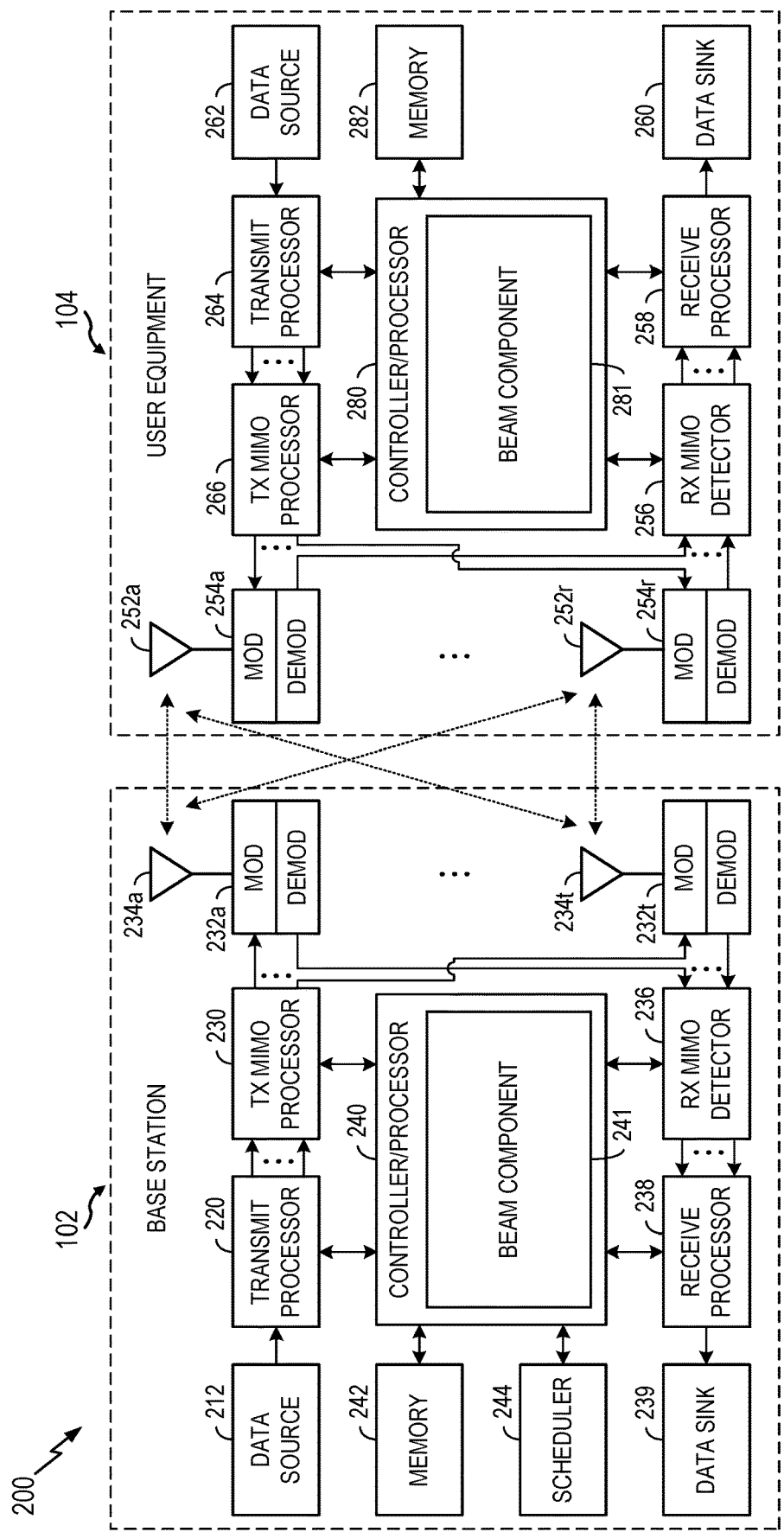
FIG. 2 is a block diagram conceptually illustrating aspects of an example base station (BS) and user equipment (UE).

FIG. 2 depicts aspects of an example BS 102 and UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes beam component 241, which may be representative of beam component 199 of FIG. 1. Notably, while depicted as an aspect of controller/processor 240, beam component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes beam component 281, which may be representative of beam component 198 of FIG. 1. Notably, while depicted as an aspect of controller/processor 280, beam component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a $5^{th}$ generation (5G) (e.g., 5G new radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Beamforming

Beamforming (which may also be referred to as spatial filtering) is used in wireless and millimeter wave (mmW) application space to increase directional antenna array gain. Devices using wireless communication technologies (e.g., portable electronic devices) may include multiple transmission and reception antennas or arrays that are configured to transmit and receive communications over a single spatial stream/beam. In one example, beamforming may be used at a transmitter device (e.g., a gNodeB (gNB)) to shape and/or steer an overall antenna beam in a direction of a target receiver device (e.g., a user equipment (UE)).

Overview of Quasi Co-Location (QCL) and Transmission Configuration Indicator (TCI)

In some new radio (NR) applications, it is essential for a UE to know which assumptions the UE can make on a channel corresponding to different transmissions. For example, the UE may need to know which reference signals (RSs) the UE can use to estimate the channel in order to decode a signal. The signal may include a physical downlink control channel (PDCCH) or a physical downlink shared channel (PDSCH). In some cases, it may also be essential for the UE to be able to report relevant channel state information (CSI) to a gNB for scheduling, link adaptation, and/or beam management purposes. In NR, quasi co-location (QCL) and transmission configuration indicator (TCI) states are used to convey information about these assumptions. The QCL and the TCI state information may reduce processing at the UE side.

QCL configuration/relationship between signals refers to a relationship between antenna ports (and corresponding signaling beams) of respective transmissions. For example, the transmissions sharing a same antenna port may experience a same channel. In some cases, the transmissions from different antenna ports may experience radio channels that share some common characteristics (which are captured by QCL relationship).

Per 3rd Generation Partnership Project (3GPP) TS 38.214, "two antenna ports are said to be quasi-co-located if properties of the channel over which a symbol on one antenna port is conveyed can be inferred from the channel over which a symbol on the other antenna port is conveyed." For example, when some antenna ports are referred to as quasi co-located (QCL'd), it means that spatial parameters of a transmission on one antenna port may be inferred from spatial parameters of another transmission on a different antenna port. Accordingly, in operation, a receiving device (e.g., the UE) may be able to perform channel estimation for demodulating data or control information received on a first set of antenna ports based on RSs received on a second set of antenna ports that are QCL'd with the first set of antenna ports. The QCL relationship between the first set of antenna ports and the second set of antenna ports may improve the chances that the UE is able to successfully decode a downlink (DL) transmission from a transmitting device (e.g., the gNB). In some cases, the gNB may transmit to the UE an indication of which antenna ports are QCL'd such that the UE is able to identify additional RSs to use for channel estimation.

The gNB may configure a set of TCI states to use to indicate to the UE which beam weights are used in DL transmissions to the UE. Each TCI state is associated with a set of RSs (e.g., synchronization signal blocks (SSBs) or different types of channel state information reference signals (CSI-RSs)). As such, when the UE receives an indication of a particular TCI state from the gNB (e.g., in downlink control information (DCI) in a transmission time interval (TTI)), the UE may identify the beam weights used over the antenna ports to transmit the RSs associated with the TCI state. Accordingly, the UE may use the RSs associated with the TCI state to perform channel estimation for demodulating the data or control information received from the gNB. In some cases, the gNB may transmit the DCI to the UE to update the TCI states (e.g., based on current channel conditions).

Figure 4:
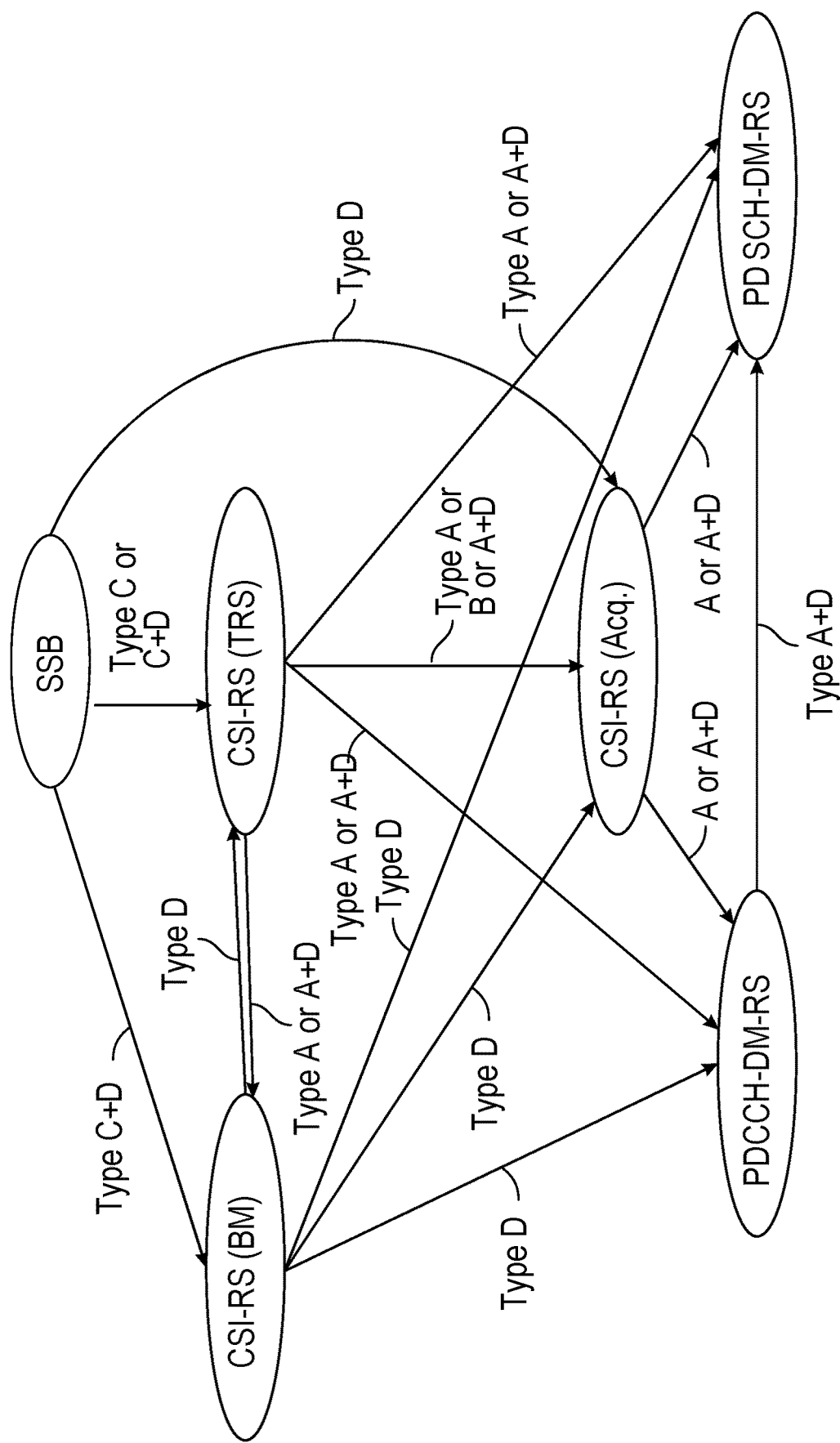
FIG. 4 illustrates example quasi co-location (QCL) types for downlink (DL) transmissions.

QCL information and/or types may depend on or be a function of other information. For example, as illustrated in FIG. 4, QCL types for DL RSs (e.g., SSBs, CSI-RSs, etc.) indicated to a UE can be based on a higher layer parameter QCL-Type and may take one or a combination of the following types: QCL-TypeA, QCL-TypeB, QCL-TypeC, and QCL-TypeD. These four QCL types indicate which large scale channel characteristics or properties are common across different antenna ports. For example, the QCL-TypeA indicates Doppler shift, Doppler spread, average delay, and delay spread. The QCL-TypeB indicates Doppler shift and Doppler spread. The QCL-TypeC indicates Doppler shift and average delay. The QCL-TypeD indicates a spatial relationship (e.g., between antenna ports used for receiving uplink (UL) signals and antenna ports for transmitting DL data).

As further illustrated in FIG. 4, the QCL concept can be used for both PDCCH and PDSCH reception at the UE. The gNB can indicate to the UE that antenna port used by a specific SSB block is QCL with the PDCCH/PDSCH. The gNB can also indicate antenna port used by a CSI-RS is QCL with the PDCCH/PDSCH. The gNB can use a combination of radio resource control (RRC) signaling, a medium access control (MAC) control element (CE), and DCI to convey this QCL information to the UE.

In some cases, the QCL-TypeA and the QCL-TypeB may be used to obtain CSI. The QCL-TypeC may be used to obtain measurements (e.g., reference signal received power (RSRP)). The QCL-TypeD may support beamforming, and help the UE to select an analog receive/transmit beam used over the radio frequency (e.g., during beam management procedures). For example, QCL Type-D mapping may indicate that a certain beam for a PDSCH is mapped to a RS resource (e.g., the SSB/CSI-RS). That is, the UE can receive the PDSCH with the same beam the UE uses for the SSB/CSI-RS resource based on the QCL mapping. In such cases, it does not mean that beam weights used for the PDSCH need to be directly obtained from the DL RS measurements, but the beam weights used for the PDSCH can be based on/derived from the DL RS measurements.

Figure 5:
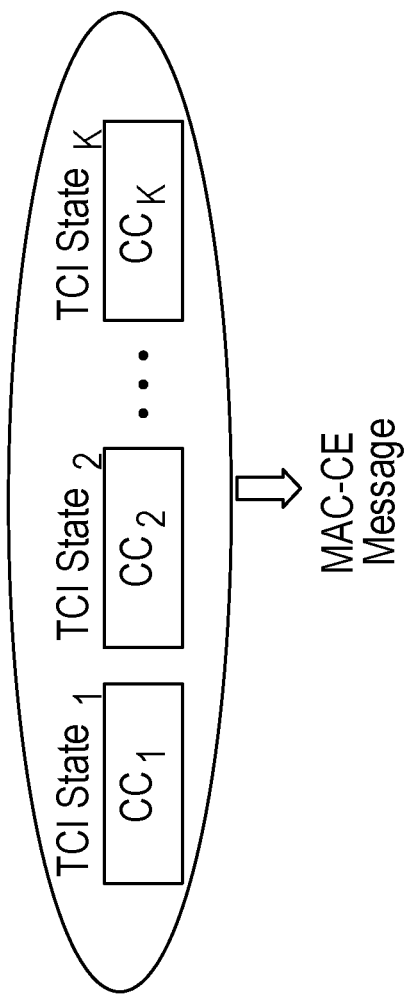
FIG. 5 illustrates example transmission configuration indication (TCI) states.

In NR, beamforming over multiple antennas with a set of beam weights at a gNB is associated with a TCI state operation. For example, a beam switch operation may correspond to change in a TCI state at the gNB side and/or beam weights used at a UE. The beam switch may be implemented on a per component carrier (CC) basis. In some cases, as illustrated in FIG. 5, a CC group-based TCI state update may be initiated, which may cause switching of beams/TCI states across multiple CCs with a single control signal (e.g., a MAC-CE message).

In some cases, multiple transmit/receive beams with a same gNB/transmission reception point (TRP) may be controlled with a single TCI state (e.g., near-field communications). This may be possible in a single frequency network (SFN) of multi-TRP (mTRP) system where a transmit/receive beam of one or more TRPs can be changed with the same TCI state (e.g., a SFN beam). However, such beam switch may not be possible in context of single gNB/TRP system.

Overview of Near-Field and Far-Field Systems

The present application relates to near-field systems. The difference between near-field and far-field systems typically relates to a distance separating transmit and receive nodes in the network.

Figure 6A:
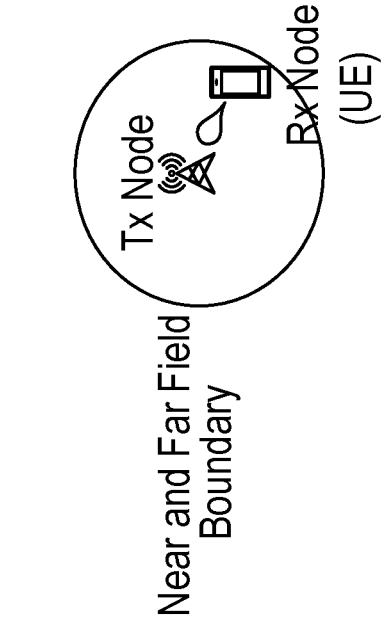
FIG. 6A illustrates example near-field operation.
Figure 6B:
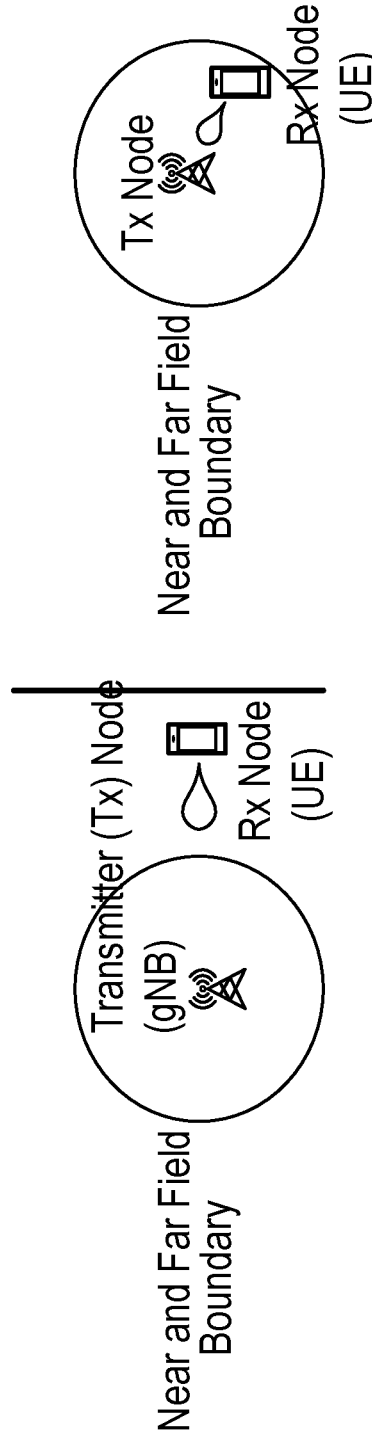
FIG. 6B illustrates example far-field operation.

As illustrated in FIG. 6A, when a transmit antenna (e.g., of a transmitter device/node such as a gNB) with a largest dimension/aperture D transmits a signal of a wavelength k, a receive antenna (e.g., of a receiver device/node such as a user equipment (UE)) is considered to be in a near-field if a distance separating the transmitting and receiving nodes is less than a Fraunhofer distance (defined as $2D^2/\lambda$) where D is equal to Nd (with d being an inter-antenna element spacing for a linear array of size N). As illustrated in FIG. 6B, a larger separation between the transmitting and receiving nodes places the receiver node in a far-field operation. The properties of transmitted electromagnetic waves change between the near- and far-fields.

A far-field distance may increase quadratically when there is an increase in array size/aperture. The far-field distance may increase linearly when there is an increase in a carrier frequency (e.g., for a same aperture). As a result, in some cases (e.g. for large arrays and higher carrier frequencies), the Fraunhofer distance at which far-field operation begins can be very large.

In conventional systems, UEs usually operate in a far-field (e.g., with respect to a gNB) and not in near-field. In such systems, a far-field distance may be at least 5 to 10 meters (m). However, in some other systems (e.g., a $6^{th}$ generation (6G) system), a near-field operation may become significant due to increased importance in higher carrier frequencies (FR4 and beyond) and larger arrays. In such systems, the near-field operation need not be near the gNB anymore. This is because, in such systems, a far-field distance may be quite large. For example, in some of these systems, the far-field distance is 20.48 m and 5.2 kilometer (km) with a 64×1 and 1024×1 array at 30 gigahertz (GHz), respectively. Also, for an aperture of 1 m, the far-field distance at 30 GHz and 120 GHz are approximately 200 m and 800 m, respectively. Example use-cases for the near-field operation in these systems include the use of assistive nodes (e.g., intelligent reflective surfaces (IRS), passive reflectarray or repeater operations).

In some cases, when a receiver device gets closer to a transmitter device to be in a near-field, techniques (e.g., for beam switching) associated with a conventional system start failing. This is because directional/hierarchical beamforming design for such receiver devices implicitly assumes that these receiver devices are operating in a far-field. Accordingly, in such cases, a beam switching operation gets complex. For example, in the far-field operation, when a UE is moving away from or towards a gNB in a straight line, and an angle from the UE to the gNB does not change, the UE may continue to use a same beam (that was previously selected). However, in the same scenario in near-field, this is not possible. This is because even when the UE and the gNB are pointing at a same direction while the UE is moving towards or away from the gNB, beam weights previously used have to change. This disclosure describes improved techniques for the beam switching in near-field operations.

Aspects Related to Beam Switching in Near-Field Operations

While a user equipment (UE) is in a far field, as illustrated in FIG. 6B, the UE and a gNB may establish a beam pair (e.g., by steering energy in a certain direction from the gNB to the UE). The UE may then move from one location to another location.

As illustrated in FIG. 6A, when the UE moves closer to the gNB (and crosses a near- and far-field boundary), the UE is in a near-field. When the UE is in the near field, the earlier beam pair (that was suitable while the UE was in the far field) may not be appropriate and a new beam pair may have to be established (e.g., based on an angle and a distance between the UE and the gNB).

Figures 7A, 7B:
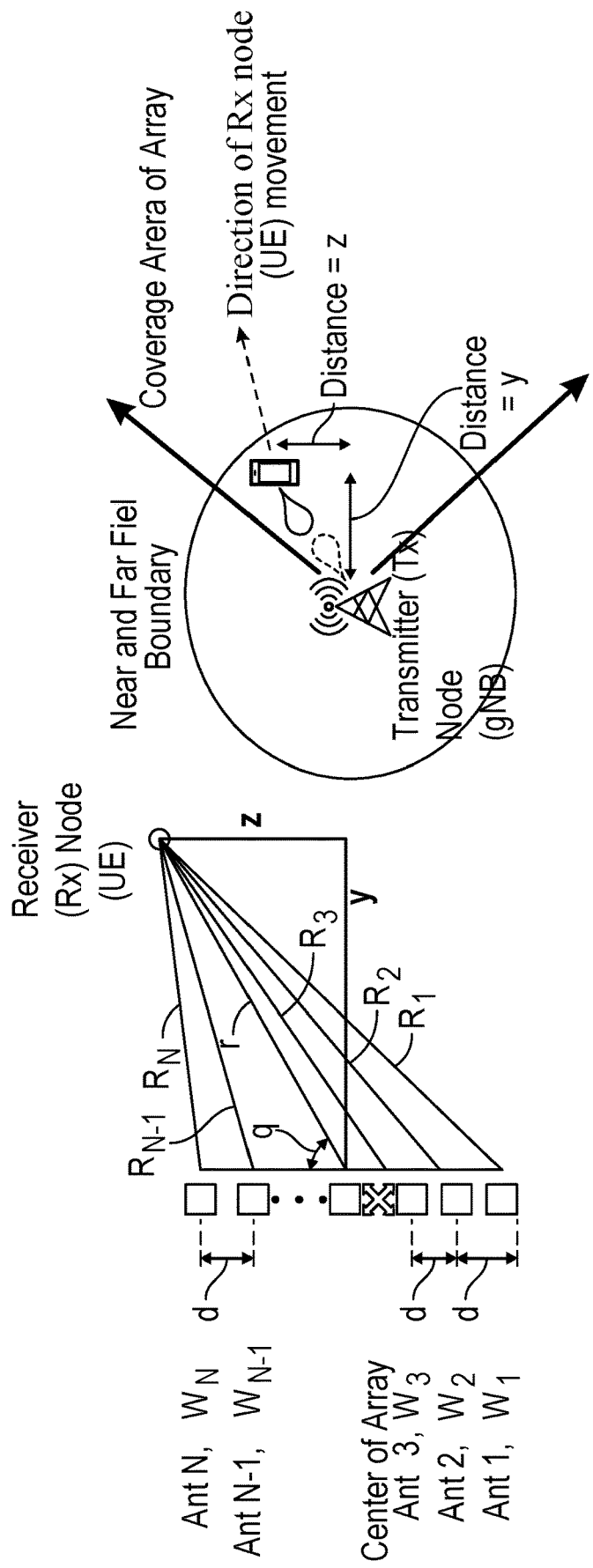
FIG. 7A illustrates example array of a network entity.
FIG. 7B illustrates example distance between a center of array of a network entity and a UE.

As illustrated in FIG. 7A, a gNB may include an array (e.g., a linear array of size N×1). As illustrated in FIG. 7B, when a UE is in a near-field, the UE is at a relative coordinate orientation of (y,z) from a center of the N×1 linear array of the gNB. In this example scenario, a new beam pair may be determined (e.g., based on values of y and z). The values of y and z may change when the UE moves. These distance values can be estimated with positioning signals (either NR-based or otherwise).

In one example scenario, the gNB and the UE may be positioned such that there may be a single straight-line trajectory between the gNB and the UE (e.g., equal to −51.3°). When the UE moves away or closer to the gNB, the angle between the gNB and the UE may not change. Over this single straight-line trajectory, different beams are used. Some beams may be from a far-field codebook. These beams may include five beams (e.g., beams 1 to 5). Some beams may be from a near-field codebook (e.g., a single near-field beam).

Figure 8:
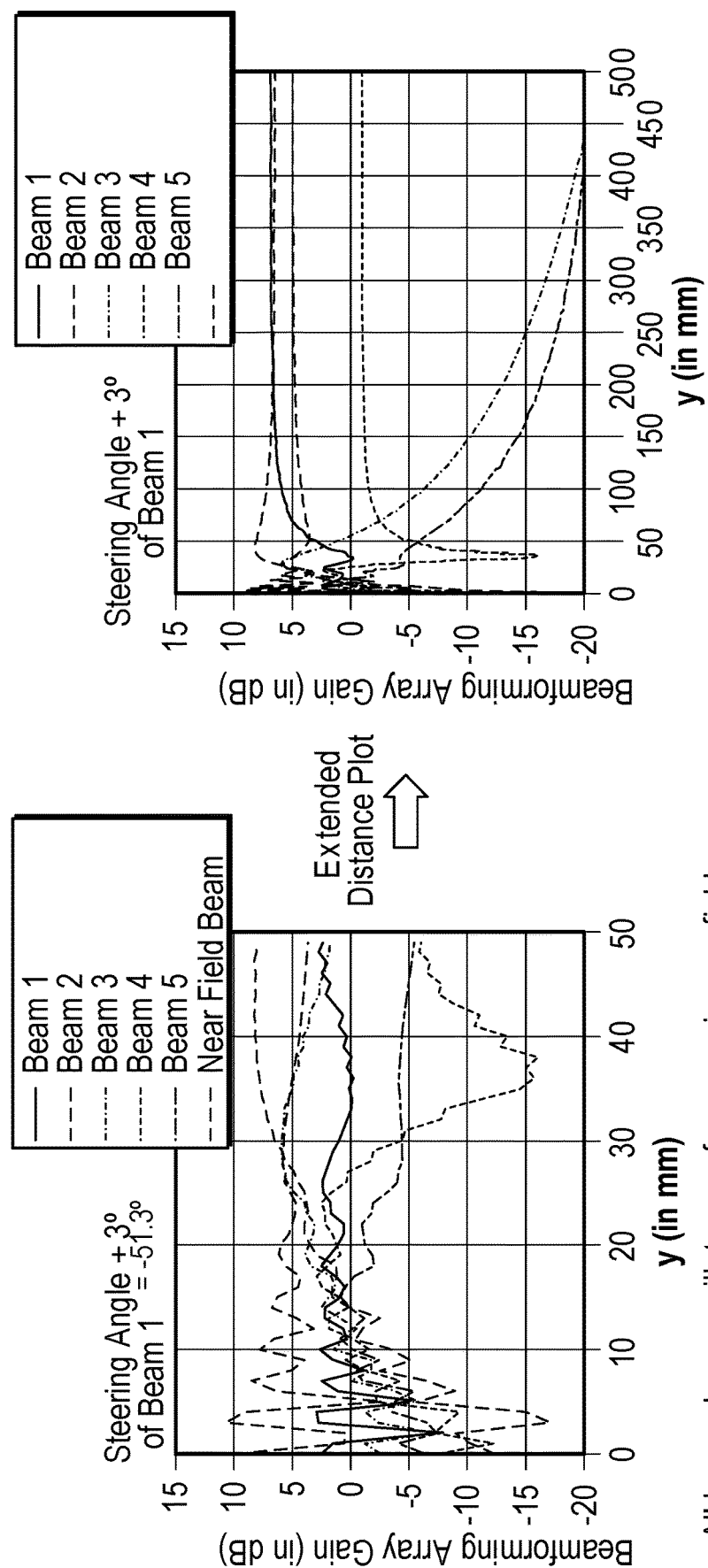
FIG. 8 illustrates example performance of different beams on a single straight-line trajectory.

As illustrated in FIG. 8, a beamforming array gain is determined for all these six beams (e.g., based on a distance y between the gNB and the UE). As illustrated, all beams have oscillatory performance in the near-field (e.g., based on the beamforming array gain for all beams). However, even when there is the oscillatory performance from all beams, the performance of the near-field beam is still better (than other beams 1 to 5) at shorter near-field distances (e.g., due to the higher beamforming array gain).

Figure 9:
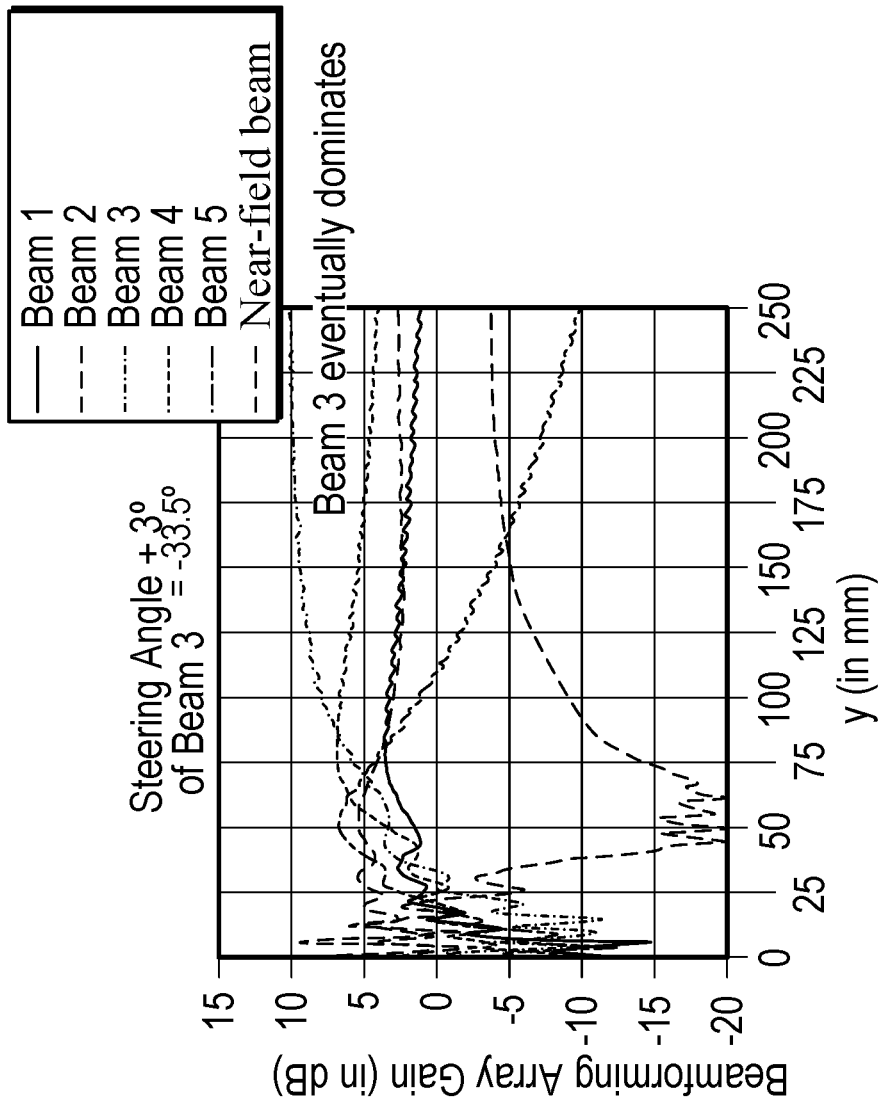
FIG. 9 illustrates another example performance of different beams on a single straight-line trajectory.

In another example scenario, the UE may be moving away from the gNB in a straight line (=)−33.5°. While the UE is moving away from the gNB, the angle between the gNB and the UE may not change. As the distance y between the gNB and the UE increases, different beams may lead to a good performance depending on the distance y. However, as illustrated in FIG. 9, a third beam (beam 3) may have a best performance among all beams (e.g., due to the higher beamforming array gain).

As noted above, in a far-field operation, when there is no change in the angle between the gNB and the UE and only the distance between the gNB and the UE is changing, there is no need for beam switching (the same far-field beam works well independent of distance). Beam switching may only be needed when both the angle between the gNB and the UE changes. However, in a near-field operation, even though the angle between the gNB and the UE may not change when the UE is moving away or closer to the gNB, beam switching at both the gNB and the UE is still necessary (e.g., as a function of a distance between the gNB and the UE). This is because, as illustrated in above noted examples, different set of beam weights work at different distances between the gNB and the UE.

Also, in the far-field operation, a QCL mapping indicated to the UE may allow the UE to perform receive (Rx) beamforming even as the UE moves. However, in the near-field operation, such QCL mapping may not help the UE since beam switching as a function of distance between the gNB and the UE is necessary. In such near-field operation cases, different transmit and receive beams may be used for connectivity (e.g., for a same quasi co-location (QCL) mapping as a function of the distance between the gNB and the UE even though a same QCL mapping may suffice in the far-field).

Aspects of the present disclosure provide apparatuses, methods, processing systems, and computer-readable mediums for enabling (fast and efficient) beam switching in near-field operations. For example, different beams may become relevant in the near-field at both gNB and UE depending on a distance between the gNB and the UE. Accordingly, in the near-field, a swift beam switch may be implemented to select a new beam based on the distance between the gNB and the UE (unlike a far-field scenario where beams may stay relevant for far longer time-scales).

The techniques described herein generally relate to beamformed communications between a transmitter device (e.g., the gNB) and a receiver device (e.g., the UE). Multiple transmit beams from a set of multiple transmit and receive beam pairs are mapped to a same transmission configuration indication (TCI) state identifier (ID), and multiple receive beams from the set of multiple transmit and receive beam pairs are mapped to a same quasi co-location (QCL) state. The multiple transmit and receive beam pairs are different from each other in that at least one of the beams are different, and depend on a distance between the transmitter device and the receiver device. Based on the distance between the transmitter device and the receiver device, a beam switch may be implemented and a new beam pair selected. This beam switch may be autonomous or indication-based.

FIG. 10 illustrates example operations 1000 for wireless communication. The operations 1000 may be performed, for example, by a UE (e.g., such as UE 104 in wireless communication network 100 of FIG. 1). The operations 1000 may be implemented as software components that are executed and run on one or more processors (e.g., controller/processor 280 of FIG. 2). Further, transmission and reception of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., the controller/processor 280) obtaining and/or outputting signals.

Operations 1000 begin, at 1010, by receiving from a network entity a first indication indicating a same QCL mapping for multiple receive beams corresponding to a group of transmit and receive beam pairs. Transmit and receive beam pairs are different from each other, and grouping of the transmit and receive beam pairs is based on a distance between the UE and the network entity. For example, the UE may receive the first indication from the network entity using antenna(s) and/or receiver/transceiver components of UE 104 shown in FIG. 1 or FIG. 2 and/or of the apparatus shown in FIG. 14.

At 1020, the UE selects one of the multiple receive beams corresponding to the group of transmit and receive beam pairs based on the distance between the UE and the network entity. For example, the UE may select one of the multiple receive beams corresponding to the group of transmit and receive beam pairs using a processor, antenna(s), and/or transceiver components of UE 104 shown in FIG. 1 or FIG. 2 and/or of the apparatus shown in FIG. 14.

FIG. 11 illustrates example operations 1100 for wireless communication. The operations 1100 may be performed, for example, by a network entity (e.g., such as BS 102 in wireless communication network 100 of FIG. 1). The operations 1100 may be implemented as software components that are executed and run on one or more processors (e.g., controller/processor 240 of FIG. 2). Further, transmission and reception of signals by the network entity in the operations 1100 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

Operations 1100 begin, at 1110, by transmitting to a UE a first indication indicating a same QCL mapping for multiple receive beams corresponding to a group of transmit and receive beam pairs. Transmit and receive beam pairs are different from each other and grouping of the transmit and receive beam pairs is based on a distance between the UE and the network entity. For example, the network entity may transmit the first indication to the UE using antenna(s) and transmitter/transceiver components of BS 102 shown in FIG. 1 or FIG. 2 and/or of the apparatus shown in FIG. 15.

At 1120, the network entity transmits to the UE a second indication indicating a selection of one of the multiple receive beams corresponding to the group of transmit and receive beam pairs based on the distance between the UE and the network entity. For example, the network entity may transmit the second indication to the UE using antenna(s) and transmitter/transceiver components of BS 102 shown in FIG. 1 or FIG. 2 and/or of the apparatus shown in FIG. 15.

Figure 12:
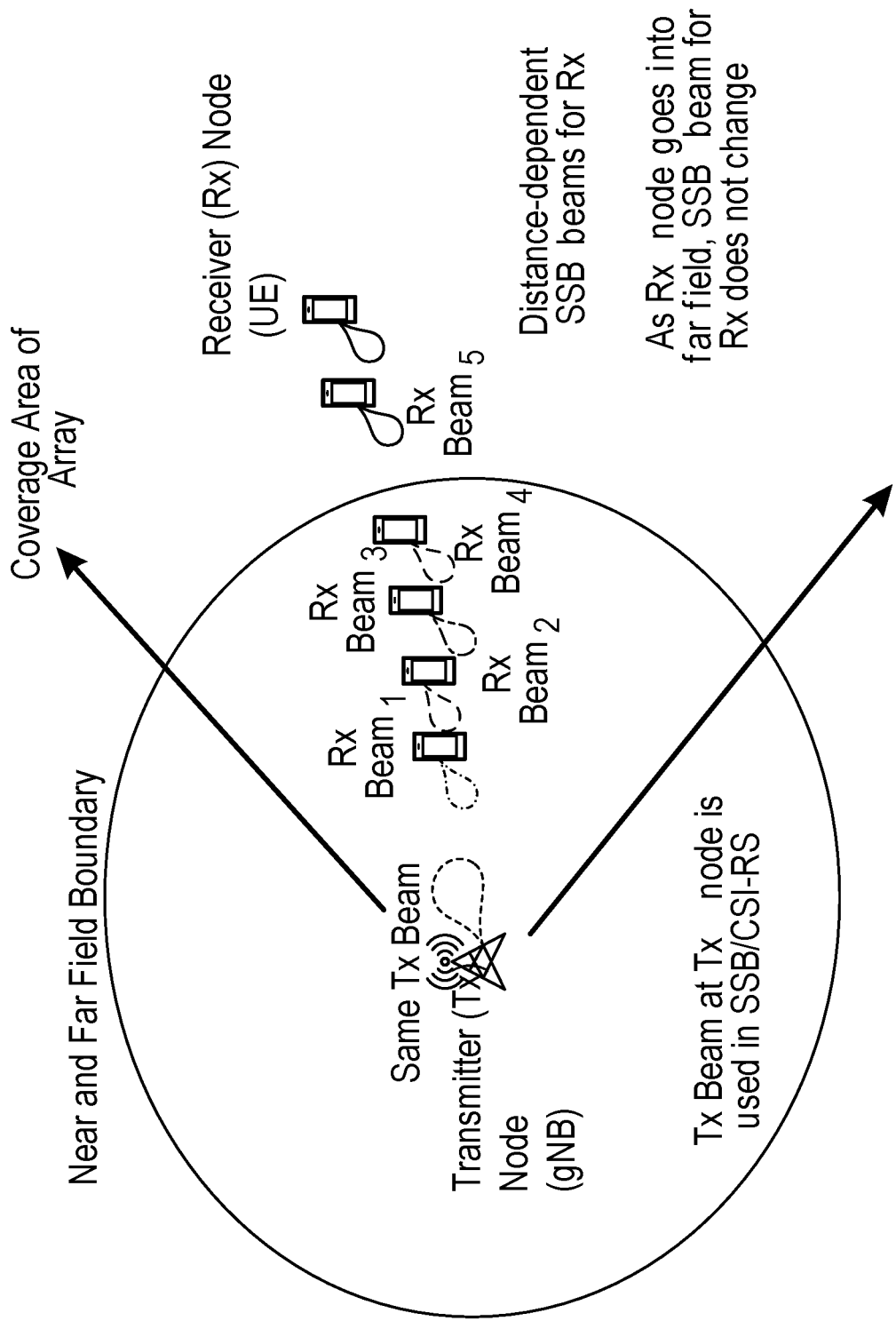
FIG. 12 illustrates example transmitter beam and multiple receiver beams as a UE moves from one location to another location.
Figure 13A:
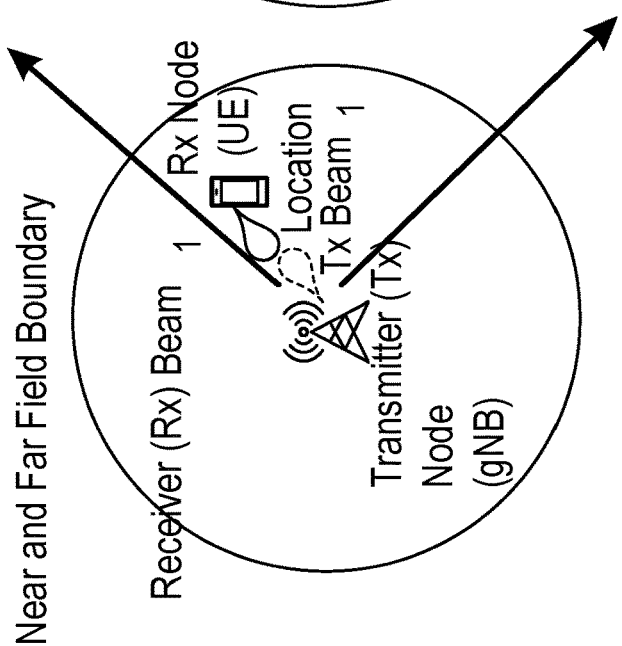
FIGS. 13A-13C illustrate different transmit and receive beam pairs mapped to a same transmission configuration indication (TCI) state.
Figure 13B:
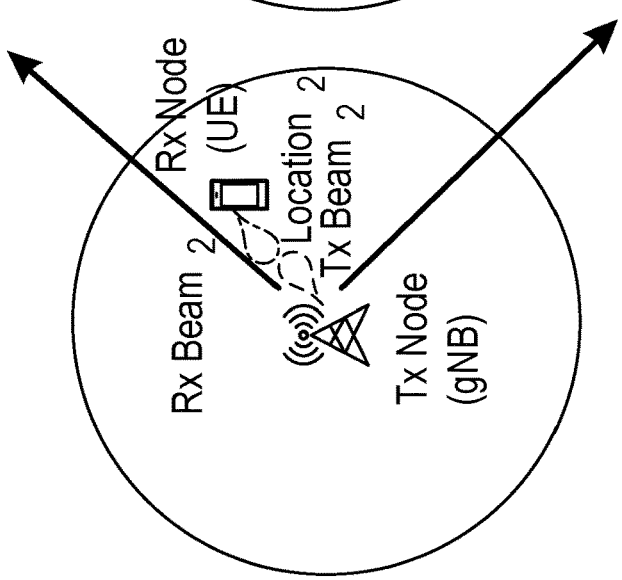
Figure 13C:
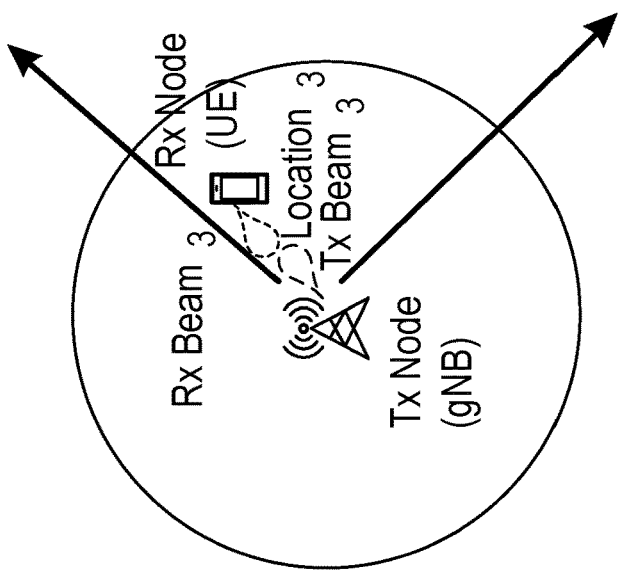

The operations shown in FIGS. 10 and 11 may be understood with reference to the FIGS. 12-13C.

As illustrated in FIG. 12, a receiver device (e.g., a UE) may move from one location (e.g., within a near-field) to another location (e.g., within the near field or in a far-field) with respect to a transmitter device (e.g., gNB). As the UE moves while the gNB remains stationary, a receive beam needs to be changed (while a transmitter beam may remain fixed). The UE selects a new receive beam based on a distance between a current location of the UE and the gNB. For example, the UE may select the new receive beam from multiple receive beams, which are mapped to a same QCL state (e.g., as a function of a distance between the UE and the gNB).

The multiple receive beams may include a first receive beam (Rx beam1) based on a first location of the UE, a second receive beam (Rx beam2) based on a second location of the UE, a third receive beam (Rx beam3) based on a third location of the UE, a fourth receive beam (Rx beam 4) based on a fourth location of the UE, and a fifth receive beam (Rx beam5) based on other locations such as a fifth and sixth locations of the UE. In the near-field, the first receive beam, the second receive beam, the third receive beam, and the fourth receive beam are different from each other based on a function of the distance between the UE and the gNB. In the far-field, the fifth receive beam may remain stationary as distance changes with angle remaining the same.

In one example, when the UE is in the first location, the UE may use the first receive beam (which is selected based on the distance between the first location of the UE and the gNB). As the UE moves from the first location to the second location, the UE may use the second receive beam (which is selected based on the distance between the second location of the UE and the gNB). The first receive beam and the second receive beam are mapped to a same QCL state via a distance-dependent QCL mapping. The QCL mapping for these multiple receive beams may be performed via a radio resource control (RRC) configuration.

In certain aspects, multiple transmitter beams (e.g., corresponding to the group of transmit and receive beam pairs discussed above) are mapped to a same TCI state. For example, the TCI state may be mapped to the different transmitter beams as a function of the distance between the UE and the gNB. In such cases, a same TCI state identifier (ID) may be reused for the multiple transmitter beams and is a function of the distance between the UE and the gNB.

As illustrated in FIGS. 13A-13C, different transmit and receive beam pairs are mapped to a same TCI state and QCL mapping of these different beam pairs is performed (e.g., as a function of distance between the UE and the gNB). The transmit and receive beam pairs may include a first transmit and receive beam pair (including a first transmit beam and a first receive beam illustrated in FIG. 13A), a second transmit and receive beam pair (including a second transmit beam and a second receive beam illustrated in FIG. 13B), and a third transmit and receive beam pair (including a third transmit beam and a third receive beam illustrated in FIG. 13C).

In certain aspects, the gNB may configure multiple distance dependent beams (e.g., the receive beams) in the same QCL mapping. The QCL mapping may be of different types. In one example, the QCL mapping may be a QCL Type A mapping. In another example, the QCL mapping may be a QCL Type B mapping. In another example, the QCL mapping may be a QCL Type C mapping. In another example, the QCL mapping may be a QCL Type D mapping.

In certain aspects, different TCI states may be defined corresponding to different gNB transmit beam weights. A beam switch across different beams may be based on a pre-defined criteria, which is a function of a distance between the UE and the gNB.

In certain aspects, a UE and/or a gNB may perform an autonomous beam switch. For example, both the UE and the gNB may autonomously switch a transmit and receive beam pair based on a distance between the UE and the gNB. In such autonomous beam switch cases, there may be some asymmetry between the UE and the gNB while performing autonomous beam switch. In one example, the asymmetry may be due to a latency/delay based on a poor estimation of the distance between the UE and the gNB. In another example, the asymmetry may be due to latencies from radio frequency (RF) circuits, which may cause slow beam switching at the UE or the gNB. To address this asymmetry, an indication indicating the switching of the transmit and receive beam pair may be transmitted. For example, in operation, when the UE moves towards the gNB, the UE can autonomously switch from a far-field beam to a near-field beam. After this beam switch, the UE may indicate the beam switch to the gNB (and further optimize the near-field beam over a few beam choices via a beam refinement procedure). Similarly, when the UE moves away from the gNB, the UE may then switch to an appropriate far-field beam. The UE may again send the indication of the beam switch to the gNB. Accordingly, the UE may consider autonomous beam switch (with the indication to the gNB after the beam switch) by configuring asymmetric distance-based switches (e.g., the far-field beam to the near-field beam at a first distance and the near-field beam to the far-field beam at a second distance).

In certain aspects, a UE and/or a gNB may perform indication-based beam switch. For example, the UE may perform the beam switch on receiving a beam switch indication from the gNB and the gNB may perform the beam switch on receiving the beam switch indication from the UE. The beam switch indication is similar to a beam switch request (BSR) when the beam switch indication is sent from the UE to the gNB. The beam switch indication is similar to a beam switch command (BSC) when the beam switch indication is sent from the gNB to the UE. In operation, a first node (e.g., the UE) may determine a distance to a second node (e.g., gNB). The first node may then send the beam switch indication to the second node. The second node may receive the beam switch indication from the first node. The second node may then switch the beam based on the beam switch indication.

In certain aspects, multiple different transmit beams corresponding to the group of transmit and receive beam pairs and mapped to different TCI states are grouped to a same TCI state group. The different transmit beams may depend on a distance between the UE and the gNB. For example, the TCI state group may be configured that may group together multiple TCI states and each of the multiple TCI states may map to a different transmit beam.

In some cases, a transmit beam is selected from the TCI state group for communications between the UE and the gNB based on the distance between the UE and the gNB. For example, individual TCI states within the TCI state group may be activated depending on the distance. In some cases, defining the TCI state group may lead to an overhead reduction as beams can be automatically switched based on a distance estimation (instead of configuring each TCI state separately). In some cases, the TCI state group may be applied across one or more component carriers (CCs).

Example Wireless Communication Devices

Figure 14:
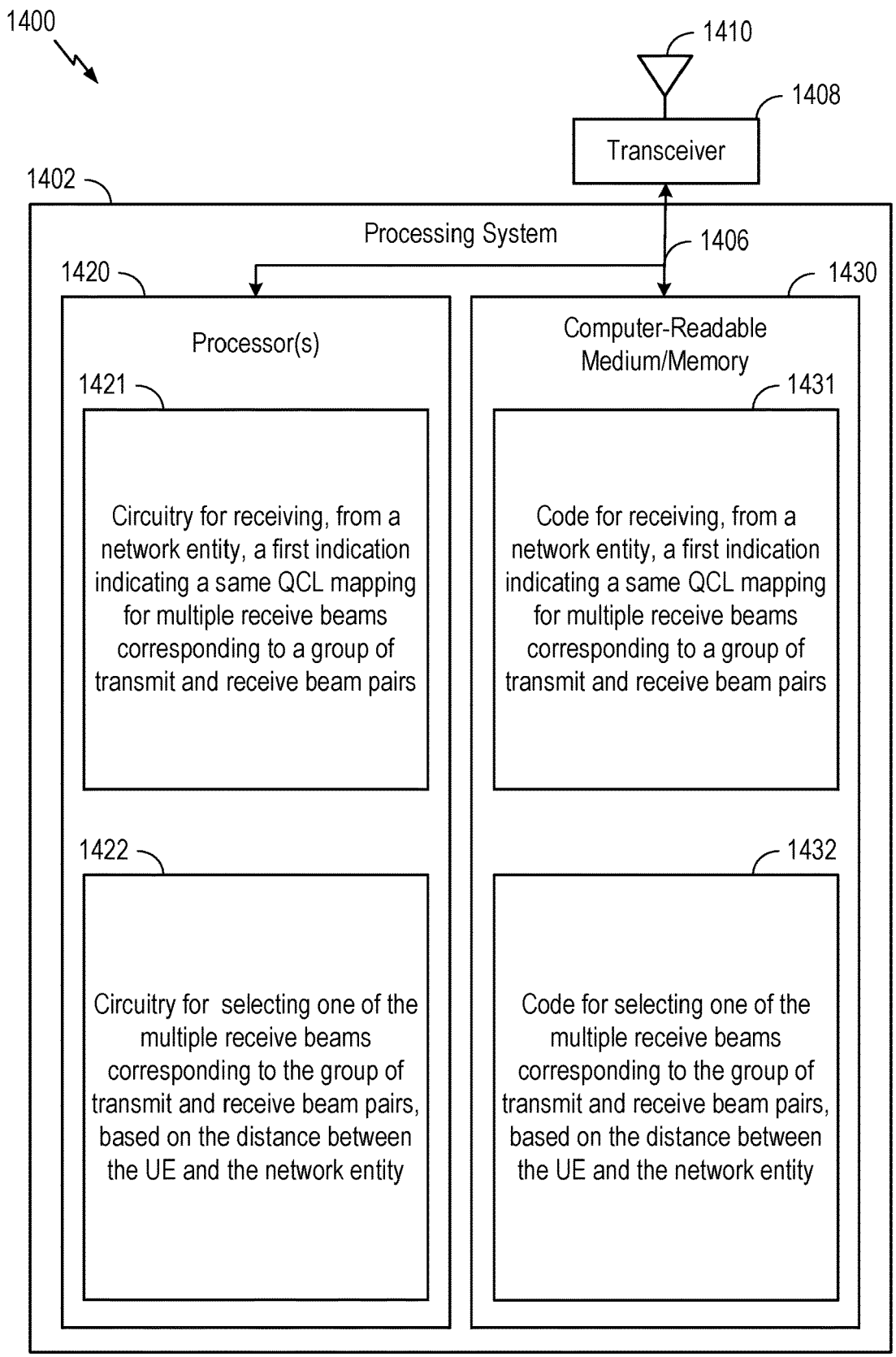
FIG. 14 depicts aspects of an example communications device.

FIG. 14 depicts an example communications device 1400 that includes various components operable, configured, or adapted to perform operations for the techniques disclosed herein, such as the operations depicted and described with respect to FIG. 10. In some examples, communication device 1400 may be a UE 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 10, or other operations for performing the various techniques discussed herein.

In the depicted example, computer-readable medium/memory 1430 stores code 1431 for receiving from a network entity a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and code 1432 for selecting one of the multiple receive beams corresponding to the group of transmit and receive beam pairs based on the distance between the UE and the network entity.

In the depicted example, the one or more processors 1420 include circuitry configured to implement the code stored in the computer-readable medium/memory 1430, including circuitry 1421 for receiving from a network entity a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and circuitry 1422 for selecting one of the multiple receive beams corresponding to the group of transmit and receive beam pairs based on the distance between the UE and the network entity.

Various components of communications device 1400 may provide means for performing the methods described herein, including with respect to FIG. 10.

In some examples, means for transmitting or sending (or means for outputting for transmission) may include the transceivers 254 and/or antenna(s) 252 of the UE 104 illustrated in FIG. 2 and/or transceiver 1408 and antenna 1410 of the communication device 1400 in FIG. 14.

In some examples, means for receiving (or means for obtaining) may include the transceivers 254 and/or antenna(s) 252 of UE 104 illustrated in FIG. 2 and/or transceiver 1408 and antenna 1410 of the communication device 1400 in FIG. 14.

In some examples, means for receiving from a network entity a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and means for selecting one of the multiple receive beams corresponding to the group of transmit and receive beam pairs based on the distance between the UE and the network entity, may include various processing system components, such as: the one or more processors 1420 in FIG. 14, or aspects of UE 104 depicted in FIG. 2, including receive processor 258, transmit processor 264, TX MIMO processor 266, and/or controller/processor 280 (including beam component 281).

Notably, FIG. 14 is an example, and many other examples and configurations of communication device 1400 are possible.

Figure 15:
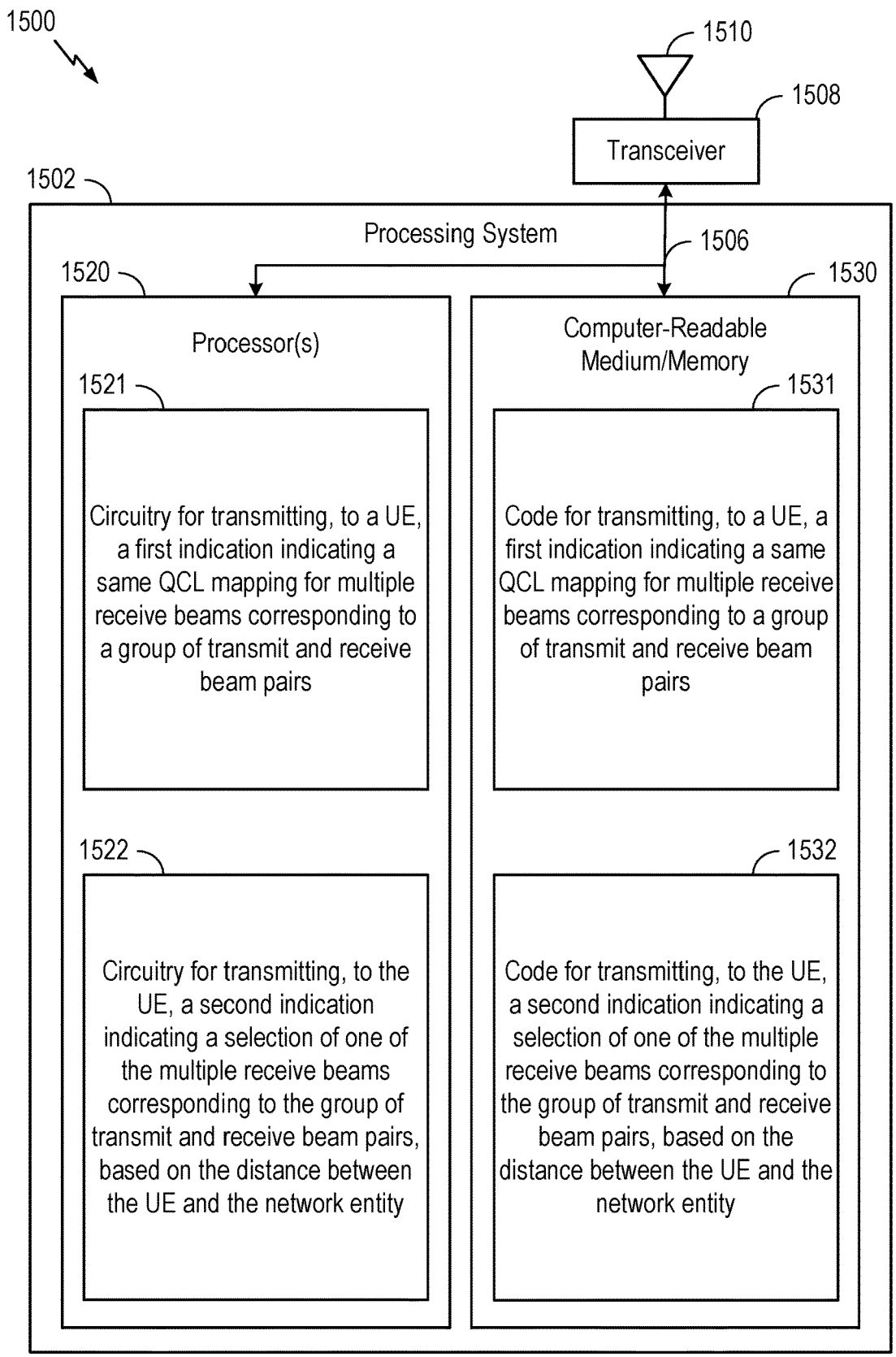
FIG. 15 depicts aspects of an example communications device.

FIG. 15 depicts an example communications device 1500 that includes various components operable, configured, or adapted to perform operations for the techniques disclosed herein, such as the operations depicted and described with respect to FIG. 11. In some examples, communication device 1500 may be a BS 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 11, or other operations for performing the various techniques discussed herein.

In the depicted example, computer-readable medium/memory 1530 stores code 1531 for transmitting to a UE a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and code 1532 for transmitting to the UE a second indication indicating a selection of one of the multiple receive beams corresponding to the group of transmit and receive beam pairs based on the distance between the UE and the network entity.

In the depicted example, the one or more processors 1520 include circuitry configured to implement the code stored in the computer-readable medium/memory 1530, including circuitry 1521 for transmitting to a UE a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and circuitry 1522 for transmitting to the UE a second indication indicating a selection of one of the multiple receive beams corresponding to the group of transmit and receive beam pairs based on the distance between the UE and the network entity.

Various components of communications device 1500 may provide means for performing the methods described herein, including with respect to FIG. 11.

In some examples, means for transmitting or sending (or means for outputting for transmission) may include the transceivers 232 and/or antenna(s) 234 of the BS 102 illustrated in FIG. 2 and/or transceiver 908 and antenna 910 of the communication device 1500 in FIG. 15.

In some examples, means for receiving (or means for obtaining) may include the transceivers 232 and/or antenna(s) 234 of the BS illustrated in FIG. 2 and/or transceiver 1508 and antenna 1510 of the communication device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive multiple input multiple output (MIMO) processors, modulators, demodulators, and the like, such as depicted in the examples in FIG. 2.

In some examples, means for transmitting to a UE a first indication indicating a same QCL mapping for multiple receive beams corresponding to a group of transmit and receive beam pairs where transmit and receive beam pairs are different from each other and grouping of the transmit and receive beam pairs is based on a distance between the UE and the network entity and means for transmitting to the UE a second indication indicating a selection of one of the multiple receive beams corresponding to the group of transmit and receive beam pairs based on the distance between the UE and the network entity, may include various processing system components, such as: the one or more processors 1520 in FIG. 15, or aspects of the BS 102 depicted in FIG. 2, including receive processor 238, transmit processor 220, TX MIMO processor 230, and/or controller/processor 240 (including beam component 241).

Notably, FIG. 15 is an example, and many other examples and configurations of communication device 1500 are possible.

Example Clauses

Implementation examples are described in the following numbered clauses:

Clause 1: A method for wireless communication by a user equipment (UE), comprising: receiving, from a network entity, a first indication indicating a same quasi co-location (QCL) mapping for multiple receive beams corresponding to a group of transmit and receive beam pairs, wherein transmit and receive beam pairs are different from each other and grouping of the transmit and receive beam pairs is based on a distance between the UE and the network entity; and selecting one of the multiple receive beams corresponding to the group of transmit and receive beam pairs, based on the distance between the UE and the network entity.

Clause 2: The method alone or in combination with the first clause, wherein multiple transmit beams corresponding to the group of transmit and receive beam pairs are mapped to a same transmission configuration indication (TCI) state.

Clause 3: The method alone or in combination with one or more of the first and second clauses, wherein the QCL mapping for the multiple receive beams corresponding to the group of transmit and receive beam pairs is performed via a radio resource control (RRC) configuration.

Clause 4: The method alone or in combination with one or more of the first through third clauses, wherein the transmit and receive beam pairs in the same QCL mapping are configured by a network entity.

Clause 5: The method alone or in combination with one or more of the first through fourth clauses, wherein one or more types of the QCL mapping comprises at least one of a QCL Type A mapping, a QCL Type B mapping, a QCL Type C mapping, or a QCL Type D mapping.

Clause 6: The method alone or in combination with one or more of the first through fifth clauses, wherein the at least one processor is further configured to autonomously switch a transmit and receive beam pair, based on the distance between the UE and the network entity.

Clause 7: The method alone or in combination with one or more of the first through sixth clauses, wherein the at least one processor is further configured to transmit, to the network entity, an indication indicating the switching of the transmit and receive beam pair.

Clause 8: The method alone or in combination with one or more of the first through seventh clauses, wherein the at least one processor is further configured to switch a transmit and receive beam pair, based on a second indication indicating the switching of the transmit and receive beam pair from the network entity.

Clause 9: The method alone or in combination with one or more of the first through eighth clauses, wherein the second indication is based on the distance between the UE and the network entity.

Clause 10: The method alone or in combination with one or more of the first through ninth clauses, wherein multiple different transmit beams corresponding to the group of transmit and receive beam pairs and mapped to different transmission configuration indication (TCI) states are grouped to a same TCI state group, and wherein the different transmit beams depend on the distance between the UE and the network entity.

Clause 11: The method alone or in combination with one or more of the first through tenth clauses, wherein a transmit beam is selected from the TCI state group for communications between the UE and the network entity, based on the distance between the UE and the network entity.

Clause 12: The method alone or in combination with one or more of the first through eleventh clauses, wherein the TCI state group is applied across one or more component carriers (CCs).

Clause 13: A method for wireless communication by a network entity, comprising: transmitting, to a user equipment (UE), a first indication indicating a same quasi co-location (QCL) mapping for multiple receive beams corresponding to a group of transmit and receive beam pairs, wherein transmit and receive beam pairs are different from each other and grouping of the transmit and receive beam pairs is based on a distance between the UE and the network entity; and transmitting, to the UE, a second indication indicating a selection of one of the multiple receive beams corresponding to the group of transmit and receive beam pairs, based on the distance between the UE and the network entity.

Clause 14: The method alone or in combination with the thirteenth clause, wherein multiple transmit beams corresponding to the group of transmit and receive beam pairs are mapped to a same transmission configuration indication (TCI) state.

Clause 15: The method alone or in combination with the thirteenth and fourteenth clauses, wherein the QCL mapping for the multiple receive beams corresponding to the group of transmit and receive beam pairs is performed via a radio resource control (RRC) configuration.

Clause 16: The method alone or in combination with one or more of the thirteenth through fifteenth clauses, wherein the at least one processor is further configured to configure the transmit and receive beam pairs in the same QCL mapping.

Clause 17: The method alone or in combination with one or more of the thirteenth through sixteenth clauses, wherein one or more types of the QCL mapping comprises at least one of a QCL Type A mapping, a QCL Type B mapping, a QCL Type C mapping, or a QCL Type D mapping.

Clause 18: The method alone or in combination with one or more of the thirteenth through seventeenth clauses, wherein multiple different transmit beams corresponding to the group of transmit and receive beam pairs and mapped to different transmission configuration indication (TCI) states are grouped to a same TCI state group, and wherein the different transmit beams depend on the distance between the UE and the network entity.

Clause 19: The method alone or in combination with one or more of the thirteenth through eighteenth clauses, wherein a transmit beam is selected from the TCI state group for communications between the UE and the network entity, based on the distance between the UE and the network entity.

Clause 20: The method alone or in combination with one or more of the thirteenth through nineteenth clauses, wherein the TCI state group is applied across one or more component carriers (CCs).

Clause 21: An apparatus, comprising: a memory comprising executable instructions; one or more processors configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When BS 180 operates in mmWave or near mmWave frequencies, the BS 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at BS. UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of physical downlink shared channel (PDSCH)-based channel state information (CSI) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications by a user equipment (UE), comprising:
   a memory comprising instructions; and
   one or more processors configured, individually or in any combination, to execute the instructions and cause the apparatus to:
      receive, from a network entity, a first indication indicating mapping of multiple receive beams from multiple transmit and receive beam pairs to a same quasi co-location (QCL) state, wherein the multiple transmit and receive beam pairs are different from each other in that each transmit and receive beam pair comprises a different receive beam from the multiple receive beams, and wherein each receive beam from the multiple receive beams is associated with a different distance between the UE and the network entity; and
select one of the multiple receive beams based on a distance between the UE and the network entity, wherein the selection comprises selecting a first receive beam based on a first distance between the UE and the network entity or a second receive beam based on a second distance between the UE and the network entity, and wherein the first receive beam and the second receive beam are mapped to the same QCL state.

2. The apparatus of claim 1, wherein multiple transmit beams from the multiple transmit and receive beam pairs are mapped to a same transmission configuration indication (TCI) state.

3. The apparatus of claim 1, wherein the mapping for the multiple receive beams is performed via a radio resource control (RRC) configuration.

4. The apparatus of claim 1, wherein the multiple transmit and receive beam pairs are configured by the network entity.

5. The apparatus of claim 1, wherein one or more types of the mapping comprises at least one of a QCL Type A mapping, a QCL Type B mapping, a QCL Type C mapping, or a QCL Type D mapping.

6. The apparatus of claim 1, wherein the one or more processors are further configured, individually or in any combination, to execute the instructions and cause the apparatus to autonomously switch a transmit and receive beam pair, based on the distance between the UE and the network entity.

7. The apparatus of claim 6, wherein the one or more processors are further configured, individually or in any combination, to execute the instructions and cause the apparatus to transmit, to the network entity, an indication indicating the switching of the transmit and receive beam pair.

8. The apparatus of claim 1, wherein the one or more processors are further configured, individually or in any combination, to execute the instructions and cause the apparatus to switch a transmit and receive beam pair, based on a second indication indicating the switching of the transmit and receive beam pair from the network entity.

9. The apparatus of claim 8, wherein the second indication is based on the distance between the UE and the network entity.

10. The apparatus of claim 1, wherein multiple different transmit beams from the multiple transmit and receive beam pairs that are mapped to different transmission configuration indication (TCI) states are grouped to a same TCI state group, and wherein the multiple different transmit beams depend on the distance between the UE and the network entity.

11. The apparatus of claim 10, wherein a transmit beam is selected from the TCI state group for communications between the UE and the network entity, based on the distance between the UE and the network entity.

12. The apparatus of claim 10, wherein the TCI state group is applied across one or more component carriers (CCs).

13. An apparatus for wireless communications by a network entity, comprising:
a memory comprising instructions; and
one or more processors configured, individually or in any combination, to execute the instructions and cause the apparatus to:
transmit, to a user equipment (UE), a first indication indicating mapping of multiple receive beams from multiple transmit and receive beam pairs to a same quasi co-location (QCL) state, wherein the multiple transmit and receive beam pairs are different from each other in that each transmit and receive beam pair comprises a different receive beam from the multiple receive beams, and wherein each receive beam from the multiple receive beams is associated with a different distance between the UE and the network entity; and
transmit, to the UE, a second indication indicating a selection of one of the multiple receive beams based on a distance between the UE and the network entity, wherein the selection comprises selection of a first receive beam based on a first distance between the UE and the network entity or a second receive beam based on a second distance between the UE and the network entity, and wherein the first receive beam and the second receive beam are mapped to the same QCL state.

14. The apparatus of claim 13, wherein multiple transmit beams from the multiple transmit and receive beam pairs are mapped to a same transmission configuration indication (TCI) state.

15. The apparatus of claim 13, wherein the mapping for the multiple receive beams is performed via a radio resource control (RRC) configuration.

16. The apparatus of claim 13, wherein the one or more processors are further configured, individually or in any combination, to configure the multiple transmit and receive beam pairs in a same QCL mapping.

17. The apparatus of claim 13, wherein one or more types of the mapping comprises at least one of a QCL Type A mapping, a QCL Type B mapping, a QCL Type C mapping, or a QCL Type D mapping.

18. The apparatus of claim 13, wherein multiple different transmit beams from the multiple transmit and receive beam pairs that are mapped to different transmission configuration indication (TCI) states are grouped to a same TCI state group, and wherein the multiple different transmit beams depend on the distance between the UE and the network entity.

19. The apparatus of claim 18, wherein a transmit beam is selected from the TCI state group for communications between the UE and the network entity, based on the distance between the UE and the network entity.

20. The apparatus of claim 18, wherein the TCI state group is applied across one or more component carriers (CCs).

21. A method for wireless communications by a user equipment (UE), comprising:
receiving, from a network entity, a first indication indicating mapping of multiple receive beams from multiple transmit and receive beam pairs to a same quasi co-location (QCL) state, wherein the multiple transmit and receive beam pairs are different from each other in that each transmit and receive beam pair comprises a different receive beam from the multiple receive beams, and wherein each receive beam from the multiple receive beams is associated with a different distance between the UE and the network entity; and
selecting one of the multiple receive beams, based on a distance between the UE and the network entity, wherein the selecting comprises selecting a first receive beam based on a first distance between the UE and the network entity or a second receive beam based on a second distance between the UE and the network entity, and wherein the first receive beam and the second receive beam are mapped to the same QCL state.

22. The method of claim 21, wherein multiple transmit beams from the multiple transmit and receive beam pairs are mapped to a same transmission configuration indication (TCI) state.

23. The method of claim 21, wherein the mapping for the multiple receive beams is performed via a radio resource control (RRC) configuration.

24. The method of claim 21, wherein the multiple transmit and receive beam pairs are configured by the network entity.

25. The method of claim 21, wherein one or more types of the QCL mapping comprises at least one of a QCL Type A mapping, a QCL Type B mapping, a QCL Type C mapping, or a QCL Type D mapping.

26. A method for wireless communications by a network entity, comprising:
transmitting, to a user equipment (UE), a first indication indicating mapping of multiple receive beams from multiple transmit and receive beam pairs to a same quasi co-location (QCL) state, wherein the multiple transmit and receive beam pairs are different from each other in that each transmit and receive beam pair comprises a different receive beam from the multiple receive beams, and wherein each receive beam from the multiple receive beams is associated with a different distance between the UE and the network entity; and
transmitting, to the UE, a second indication indicating a selection of one of the multiple receive beams based on a distance between the UE and the network entity, wherein the selection comprises selection of a first receive beam based on a first distance between the UE and the network entity or a second receive beam based on a second distance between the UE and the network entity, and wherein the first receive beam and the second receive beam are mapped to the same QCL state.

27. The method of claim 26, wherein multiple transmit beams from the multiple transmit and receive beam pairs are mapped to a same transmission configuration indication (TCI) state.

28. The method of claim 26, wherein the QCL mapping for the multiple receive beams is performed via a radio resource control (RRC) configuration.

29. The method of claim 26, further comprising configuring the multiple transmit and receive beam pairs in a same QCL mapping.

30. The method of claim 26, wherein one or more types of the mapping comprises at least one of a QCL Type A mapping, a QCL Type B mapping, a QCL Type C mapping, or a QCL Type D mapping.

* * * * *